(12) United States Patent
Tenmyo

(10) Patent No.: US 7,486,885 B2
(45) Date of Patent: Feb. 3, 2009

(54) ILLUMINATION APPARATUS AND PHOTOGRAPHING APPARATUS HAVING THE SAME

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 11/054,536

(22) Filed: Feb. 10, 2005

(65) Prior Publication Data

US 2006/0083508 A1 Apr. 20, 2006

(30) Foreign Application Priority Data

Mar. 11, 2004 (JP) ............................... 2004-068795

(51) Int. Cl.
 *G03B 15/03* (2006.01)
(52) U.S. Cl. ...................... 396/198; 396/199; 396/267; 362/16
(58) Field of Classification Search ................ 396/198, 396/199, 267; 362/3, 7, 16; 348/370, 371
See application file for complete search history.

(56) References Cited

U.S. PATENT DOCUMENTS

| | | | |
|---|---|---|---|
| 3,474,242 A | 10/1969 | Forrant | 240/1.3 |
| 6,072,551 A | 6/2000 | Jannson et al. | 349/64 |
| 6,400,905 B1 | 6/2002 | Tenmyo | 396/175 |
| 6,430,371 B1 | 8/2002 | Cho | 396/176 |
| 7,127,163 B2 * | 10/2006 | Lee et al. | 396/198 |
| 7,224,501 B2 * | 5/2007 | Kojima | 359/16 |

FOREIGN PATENT DOCUMENTS

| | | |
|---|---|---|
| EP | 0 957 392 A1 | 11/1999 |
| EP | 1 099 902 A1 | 5/2001 |
| JP | 59-226303 A | 12/1984 |
| JP | 8-43887 A | 2/1996 |
| JP | 10-208529 A | 8/1998 |
| JP | 10-293304 A | 11/1998 |
| JP | 2000-314908 A | 11/2000 |
| JP | 2001-255574 A | 9/2001 |

OTHER PUBLICATIONS

European Search Report for European Application No. 05003318.2 issued Jul. 13, 2007.
Chinese Office Action in Chinese Application No. 200500544336 issued Oct. 26, 2007.

* cited by examiner

*Primary Examiner*—W. B. Perkey
(74) *Attorney, Agent, or Firm*—Fitzpatrick, Cella, Harper & Scinto

(57) ABSTRACT

An illumination apparatus applies uniform light beams having a fixed angle distribution as illumination light to obtain illumination having a uniform light distribution. The illumination apparatus includes a light source and an optical member having an incidence surface on which light is made incident and an emission surface through which the light made incident on the incidence surface is emitted as illumination light. The optical member further has a light direction conversion surface disposed so as to face the emission surface for, while regulating a traveling direction of light made incident on the incidence surface within the optical member, and guiding the light to the emission surface. The optical member also has a plurality of prism-like portions each having a total reflection surface and a reincidence surface continuously formed in the light direction conversion surface.

13 Claims, 37 Drawing Sheets

4g

4g

4g

4g

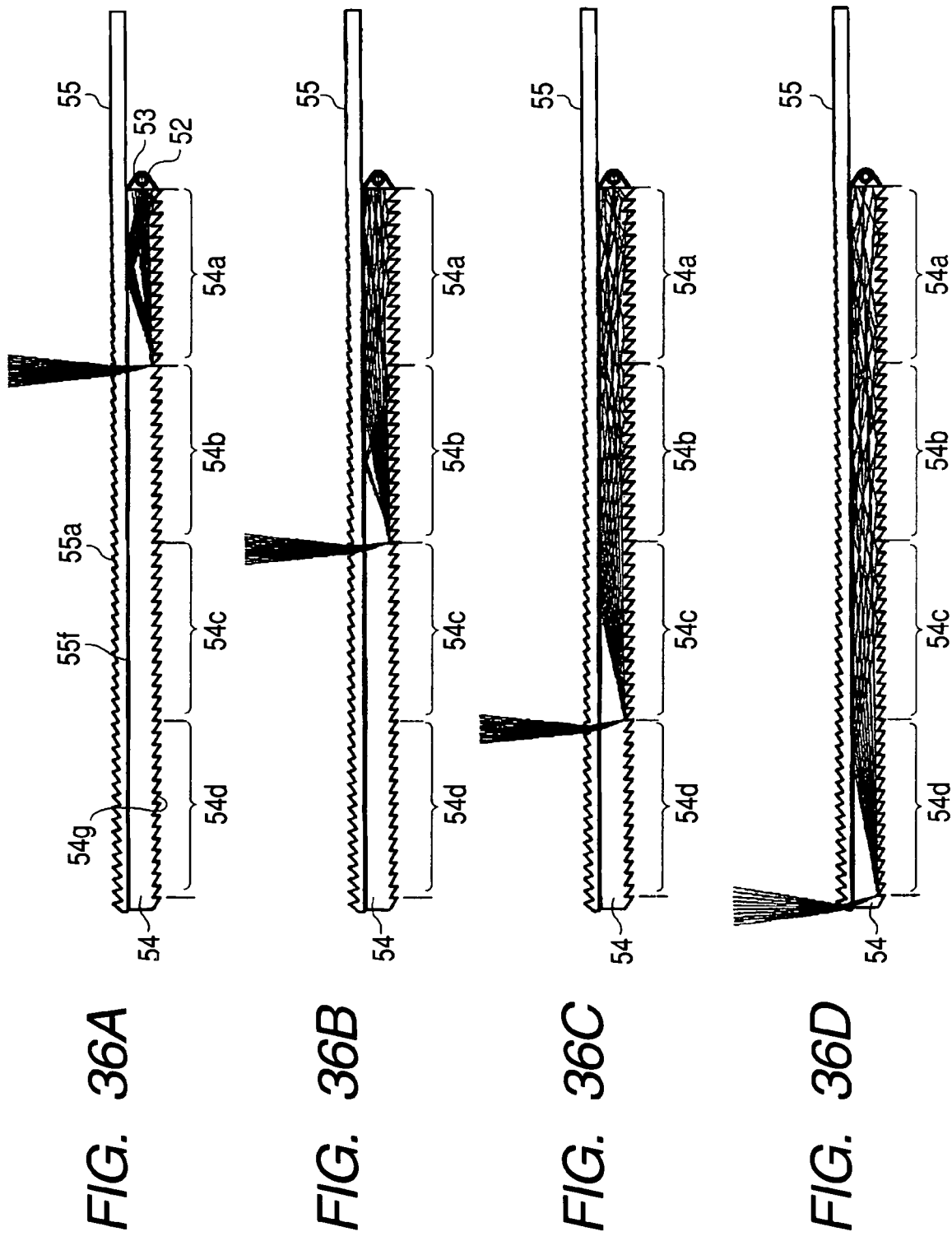

ILLUMINATION APPARATUS AND PHOTOGRAPHING APPARATUS HAVING THE SAME

BACKGROUND OF THE INVENTION

1. Field of the Invention

The present invention relates to an illumination apparatus and a photographing apparatus having the same.

2. Related Background Art

In recent years, in order to make the photographing possible in a situation in which the sufficient exposure is not obtained as in the photographing at night or in the photographing in shade, an artificial illumination apparatus is used in an optical photographing apparatus typified by a digital camera. As for the optical photographing apparatus including such the illumination apparatus, for example, there are known one mounting an illumination apparatus having an LED as a light source for emitting stationary light for photographing of a moving picture, and one mounting a stroboscope which has been frequently used in order to photograph a still image.

Many illumination apparatuses of this sort normally cover a photographing distance range of about 50 cm to about 3 m as normal photographing distances. Thus, each of them is adjusted so as to have the light distribution characteristics suitable for such the distance.

On the other hand, in recent digital cameras, the number of photographing apparatuses is increasing each of which can photograph even at the very short distance, e.g., even at close range of about several centimeters from a photographing lens.

If the illumination apparatus adopting the conventional system is used under such circumstances, in particular, in the photographing at close range, the sufficient characteristics cannot be obtained in terms of the illuminating light. That is, a part of the illuminating light is blocked off by a photographing lens barrel, and hence the whole necessary surface to be illuminated cannot be uniformly illuminated by the illuminating light in some cases. In addition, since a distance to a subject is very short, the exposure for the subject becomes overexposed, and hence the preferable illumination state cannot be obtained in some cases.

For the purpose of avoiding such conditions, in order to make it possible to illuminate corresponding to a subject which is in a short distance away from a photographing apparatus, a large number of illumination apparatuses dedicated to the proximity photographing have been proposed to be commercialized. For example, a stroboscope for macro photographing is generally well known in which a ring-like slender light source is disposed at the head of a photographing lens barrel in order to previously prevent an unbalanced dark shadow from being generated at the back of a subject. However, since such a stroboscope is very expensive, it is difficult to install the stroboscopes in all the optical photographing apparatus.

In addition, recently, an illumination apparatus using a light emitting diode (LED) as a simplified illumination light source for a video camera is installed in a main body of an optical photographing apparatus. The illumination apparatus using a light source such as an LED shows its effect under the very dark situation to which the outside light is hardly applied. However, since similarly to the case of the illumination using the above-mentioned stroboscope, the eclipse by the photographing lens barrel may occur in some cases, it may not safely be said that such an illumination apparatus is an illumination optical system suitable for the short distance photographing.

As described above, it is very difficult to carry out the illumination suitable for both the normal photographing and the short distance photographing (macro photographing) with an illumination apparatus mounted in a small space given to the optical photographing apparatus. Actually, however, the illumination apparatus is required to be suitable for both the normal photographing and the short distance photographing, and there is desired the appearance of the illumination optical system which fulfills the illumination corresponding to such individual photographing states, and which can be inexpensively configured.

Then, in order to respond to the above-mentioned demand, an illumination apparatus is proposed in which fibers for guiding fluxes emitted from a light source to the circumference of a photographing lens are disposed in a ring-like shape, and the light emitted from the fibers is used for illumination light (see Japanese Patent Application Laid-Open No. 2000-314908 for example). In addition, an illumination apparatus is proposed which is switchable between two states, one state being a normal stroboscopic photographing state, and the other state being a state in which light beams are guided to a light guide portion for guiding the light emitted from a flash light emitting portion to a plane of projection in the periphery of a photographing lens barrel portion (refer to Japanese Patent Application Laid-Open No. H08-043887 for example). Moreover, a stroboscopic apparatus is proposed which is configured so that the stroboscopic apparatus is mountable on a camera and has such a ring-like portion as to surround a photographing lens barrel of the camera, and strobe light is guided in a circumferential direction of the ring-like portion, and then the light reflected by a reflecting surface of the ring-like portion is emitted through an emission surface facing the reflecting surface (see Japanese Patent Application Laid-Open No. 2001-255574 for example).

However, in the case of the above-mentioned illumination apparatus using the fibers, it is necessary to use a large number of fibers, and hence the product cost increases. In addition, though the emission positions of the light beams can be uniformly arranged in the peripheral portion of the photographing lens barrel, the light distribution characteristics cannot be controlled. Hence, it can be a high possibility that the illumination apparatus concerned becomes an apparatus having the light distribution characteristics having a range wider than an actually required irradiation range.

In addition, with respect to the above-mentioned illumination apparatus in which optical path thereof is selectable between the two states, i.e., the normal stroboscopic photographing state, and the state in which light beams are guided to the light guide portion for guiding the light emitted from the flash light emitting portion to the plane of projection in the periphery of the photographing lens barrel portion, for example, it is conceivable that there is adopted an optical system in which a diffusion surface having a predetermined distribution is formed on a side opposite to the emission surface of the ring-like member as being frequently used in a back light illumination optical system, and a quantity of light emitted through the emission surface is uniformized based on the distribution of the diffusion surface. Since in such an optical system, the diffusion surface is interposed, it is difficult to construct the illumination optical system which is excellent in efficiency.

Moreover, the above-mentioned stroboscopic apparatus is configured so that the light beams are guided from the light source to the ring-like light guide member and emitted through the emission surface. However, the light beams are taken in the ring-like light guide member from both the directions of the ring-like light guide member, and also the shape of the reflecting surface of the ring-like light guide member is formed in the form of an intermittent prism surface in which the density gradually changes. Hence, only a specific angle light component incident on the ring-like light guide member at a specific angle is effectively utilized. As a result, it is difficult to configure the illumination optical system having the excellent efficiency.

SUMMARY OF THE INVENTION

In light of the foregoing, it is a principal object of the present invention to provide an illumination apparatus which is capable of applying uniform light beams having a fixed angle distribution as illumination light to obtain illumination having a uniform light distribution, and a photographing apparatus having the same installed therein.

In order to attain the object, the present invention provides an illumination apparatus, including a light source and an optical member which has an incidence surface on which light emitted from the light source is incident, and an emission surface through which the light incident on the incidence surface is emitted as illumination light. The illumination apparatus is characterized in that the optical member further has a light direction conversion surface disposed so as to face the emission surface for, while regulating a traveling direction of light incident on the incidence surface within the optical member, guiding the light to the emission surface. The light direction conversion surface is being continuously formed with a plurality of prism-like portions each having a total reflection surface and a reincidence surface; and of light which travels within the optical member to reach the total reflection surface of one of the prism-like portions, only light of a predetermined angle component is totally reflected on the total reflection surface toward the emission surface, and light which is not totally reflected on the total reflection surface other than the light of the predetermined angle component is refracted in the one prism-like portion and guided to an outside of the optical member once and is then guided to the optical member again through the reincidence surface of a prism-like portion next to the one prism-like portion.

Other objects and features of the present invention will become clear by the following preferred embodiments of the present invention which will be described with reference to the accompanying drawings.

BRIEF DESCRIPTION OF THE DRAWINGS

FIG. 31 is a front view of a digital camera in which a stroboscope for macro photographing according to a fourth embodiment of the present invention is built in;

FIGS. 36A, 36*b*, 36C, and 36D are vertical cross sectional views each showing a main portion of a stroboscopic apparatus as an illumination apparatus according to a sixth embodiment of the present invention.

DESCRIPTION OF THE PREFERRED EMBODIMENTS

Preferred embodiments of the present invention will hereinafter be described in detail with reference to the accompanying drawings.

First Embodiment

Figure 1:
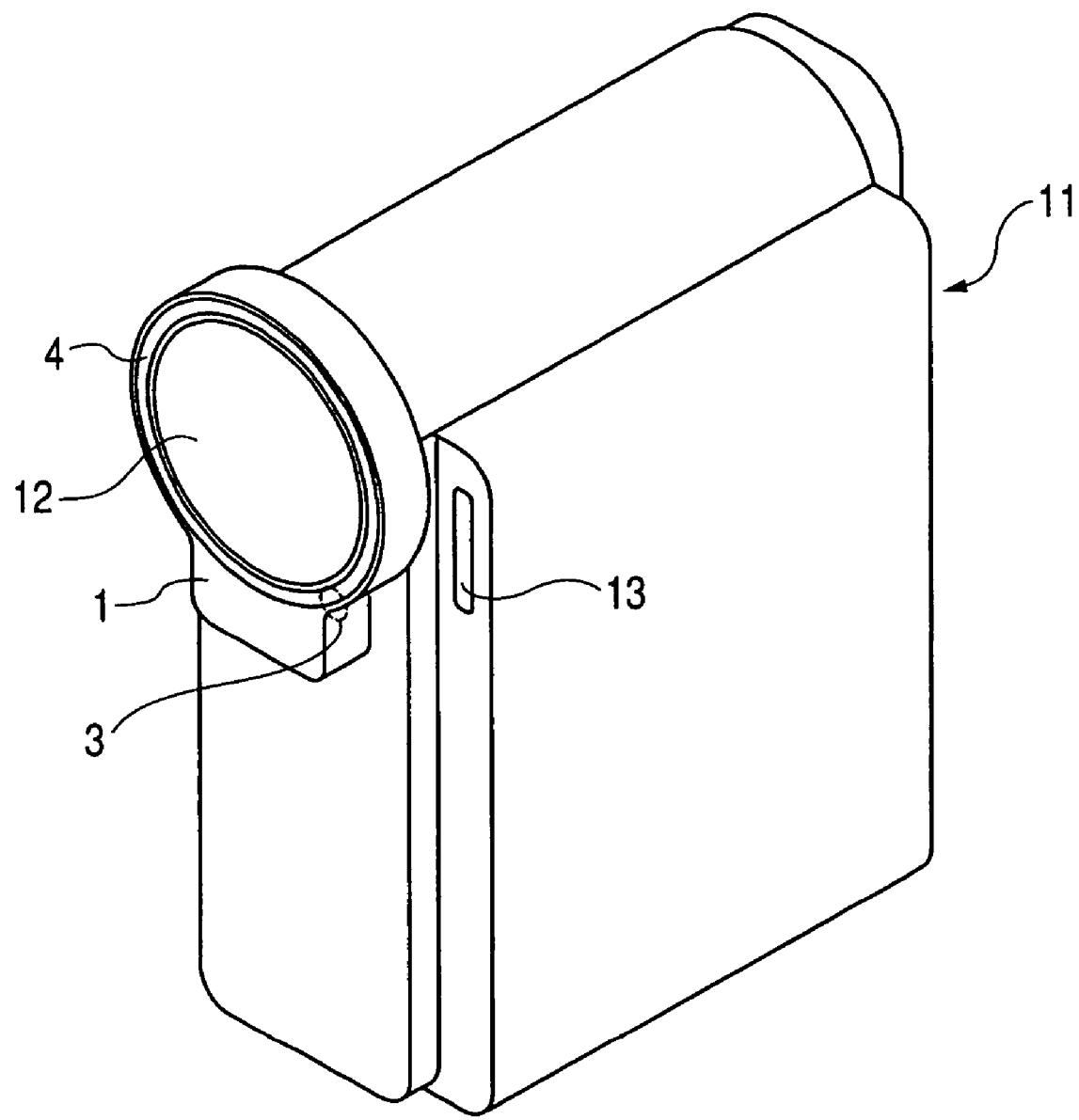
FIG. 1 is a perspective view of a video camera in which a ring light for macro photographing as an illumination apparatus according to a first embodiment of the present invention is installed.
Figure 2:
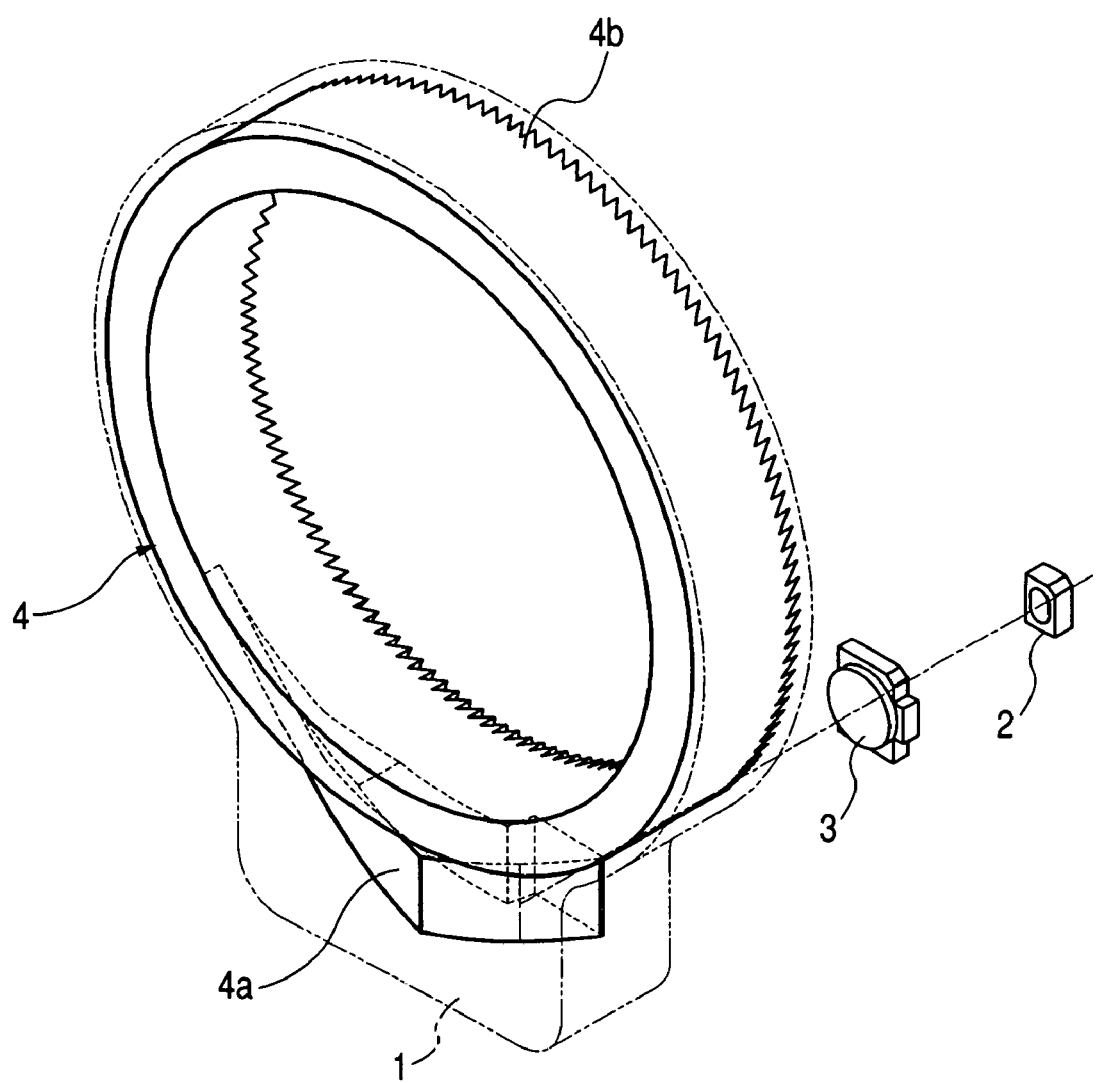
FIG. 2 is a perspective view of a main optical system of the ring light for macro photographing installed in the video camera shown in FIG. 1.
Figure 3:
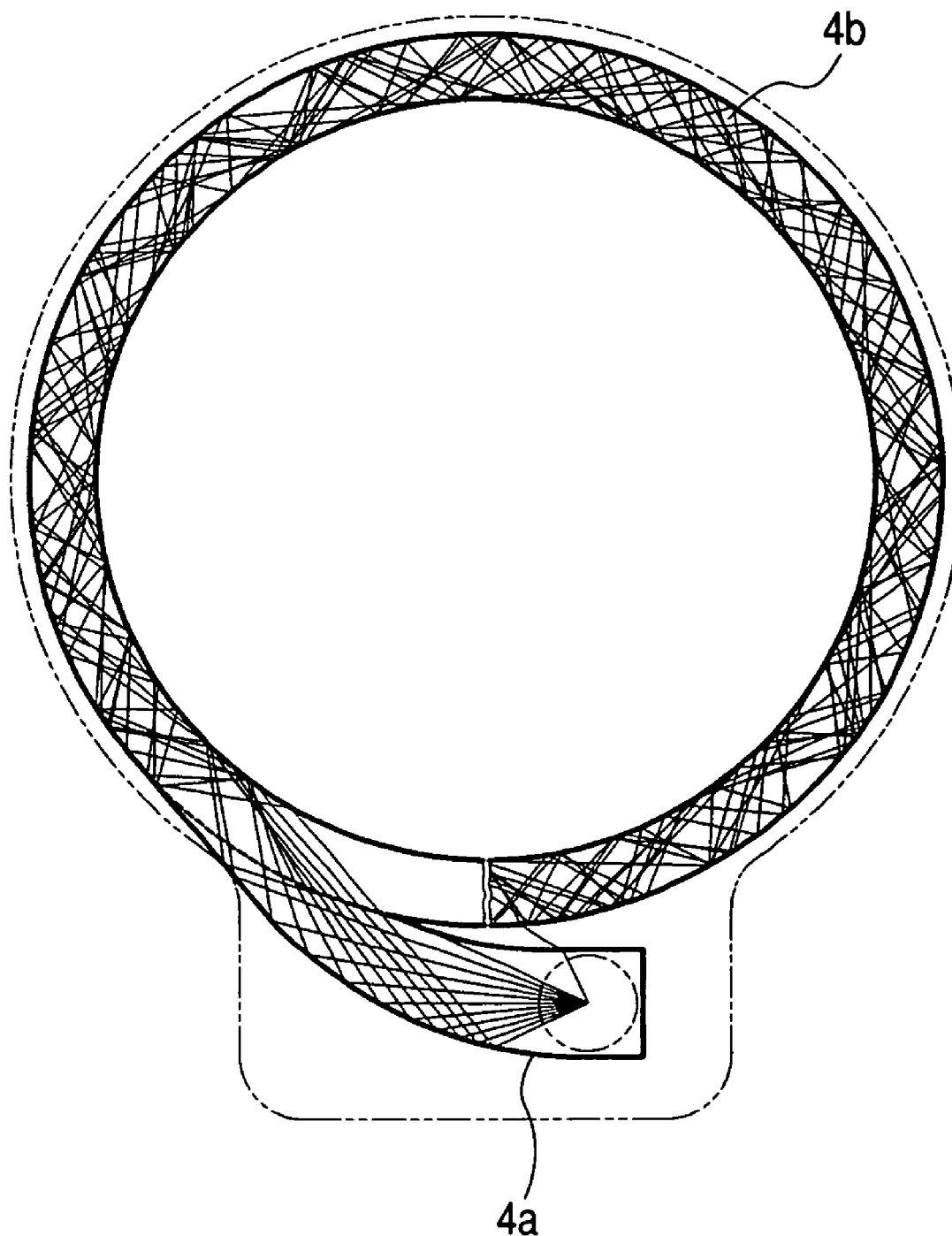
FIG. 3 is a vertical cross sectional view of a main portion constituting the optical system of the ring light for macro photographing shown in FIG. 2.
Figure 4A:
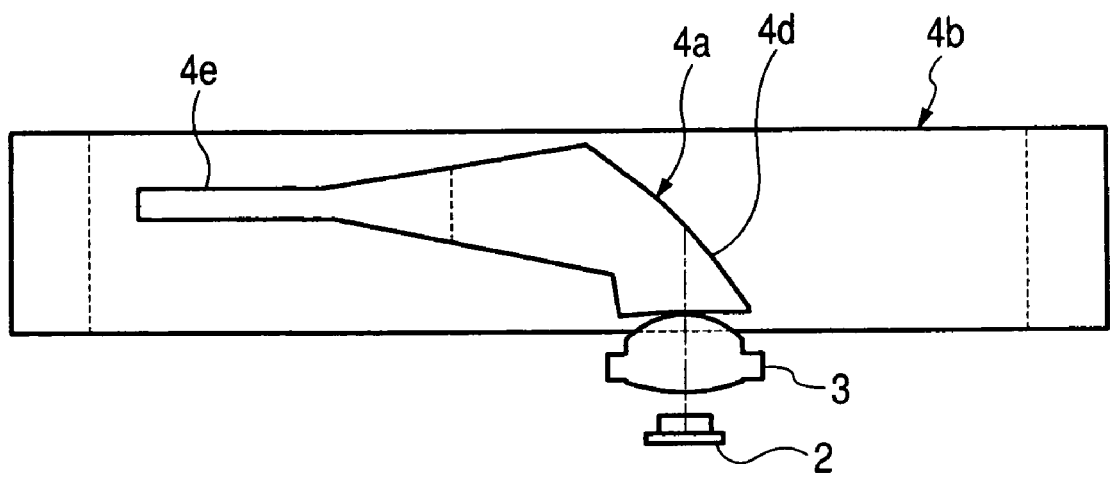
FIG. 4A is a transverse cross sectional view showing the vicinity of an incidence surface of an optical member 4.
Figure 4B:
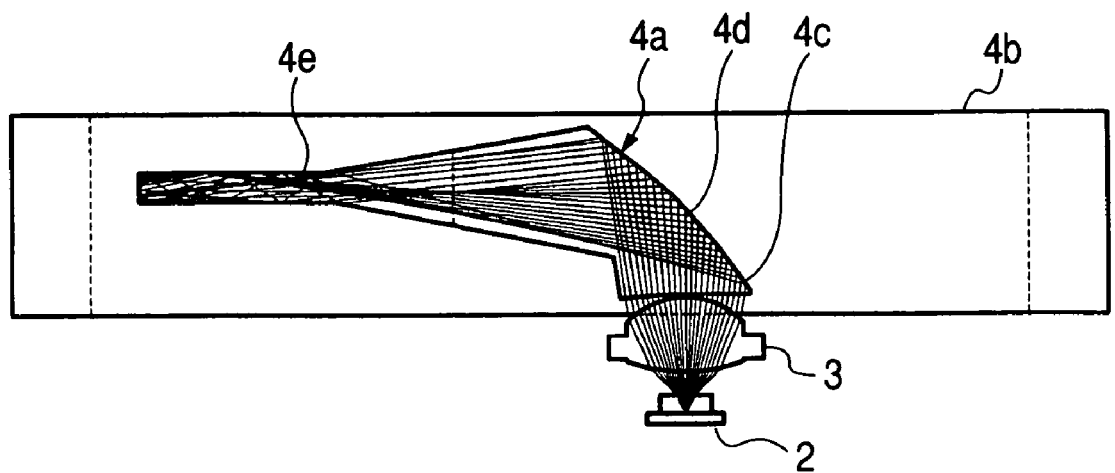
FIG. 4B is a view schematically showing loci of light beams which are made incident from an LED 2 on an optical member 4a through a condenser lens 3.

FIG. 1 is a perspective view of a video camera in which a ring light for macro-photographing as an illumination apparatus according to a first embodiment of the present invention is installed; FIG. 2 is a perspective view of a main optical system of the ring light for macro-photographing installed in the video camera shown in FIG. 1; FIG. 3 is a vertical cross sectional view of a main portion constituting the optical system of the ring light for macro-photographing shown in FIG. 2; FIG. 4A is a transverse cross sectional view showing the vicinity of an incidence surface of an optical member 4; and FIG. 4B is a view schematically showing loci of light beams which are made incident from an LED 2 on an optical member 4*a* through a condenser lens 3.

The video camera, as shown in FIG. 1, includes a video camera apparatus main body 11 (hereinafter referred to as an apparatus main body 11). A lens barrel 12 having a photographing lens, a stroboscope light emitting portion 13, and a ring light for macro-photographing are incorporated in the apparatus main body 11. The ring light for macro photographing, as shown in FIG. 2, includes the LED 2 for emitting while light, and the condenser lens 3 for condensing light beams emitted from the LED 2. The condenser lens 3 is made of a resin material having high transparency. The LED 2 and the condenser lens 3 are installed in the apparatus main body 11. The light beams, which have been emitted from the LED 2 and condensed by the condenser lens 3, are incident on the optical member 4 made of a light-transmissive resin material. The optical member 4, as shown in FIGS. 1 and 2, is held by a ring light portion 1 provided in a head portion of the lens barrel 12. The optical member 4, as shown in FIG. 2, includes the first optical member 4*a* and a second optical member 4*b* which is joined integrally with the first optical member 4*a*. The first optical member 4*a* is a member for converting the directions of light beams condensed by the condenser lens 3 to collect the light beams in a narrow range. The second optical member 4*b* is constituted by a ring-like member, and is disposed in a head portion of the lens barrel 12 so as to be aligned with an optical axis of the photographing lens. An emission surface through which the light beams are to be emitted is formed in one end face of the second optical member 4*b*, and a light direction conversion surface is formed in the other end face thereof. The light beams which have been made incident on the second optical member 4*b* from the first optical member 4*a*, as shown in FIG. 3, are guided to the emission surface to be emitted through the emission surface while their directions are converted by the light direction conversion surface within the inside of the second optical member 4*b*.

The above-mentioned video camera has a macro-photographing mode in which such proximity photographing as to have a distance of about 1 cm, for example, to a subject is made possible. In setting such a macro-photographing mode, the ring light for macro photographing of this embodiment is used. The ring light for macro photographing applies the light beams from the LED 2 which can be regarded as a point light source through the emission surface of the second optical member 4*b*. Hence, using the ring light for macro photographing makes it possible to carry out a uniform illumination for a subject, and also makes it possible to previously prevent generation of an unnatural shadow due to an eclipse of the illumination light by the lens barrel 12.

Note that with the above-mentioned video camera, it is also possible to set a super-night mode as a photographing mode, i.e., a mode in which the illumination using a high luminance LED is carried out under dark circumference in which a quantity of outside light is less and thus auxiliary light is required, and the photographing is carried out using this illumination. This mode is a known mode in which normally, a distance to a subject is supposed to be equal to or longer than 50 cm. Then, in the case of this mode, there is no need to use the ring light for macro photographing of this embodiment.

The first optical member 4a of the ring light for macro photographing, as shown in FIGS. 4A and 4B, is provided with an incidence surface 4c facing the condenser lens 3, a total reflection surface 4d constituted by a continuous aspheric surface, and a connection portion 4e through which the first optical member 4a is connected to the second optical member 4b. The light beams emitted from the LED 2, as shown in FIG. 4B, is regulated so as to fall within a certain irradiation angle range by the condenser lens 3. The irradiation angle range at this time satisfies an irradiation angle range required for the photographing distance (e.g., equal to or longer than 50 cm) of the normal video camera. The irradiation angle range is adjusted by a shape of the condenser lens 3, and a distance between the LED 2 and the condenser lens 3. The light beams which have been applied through the condenser lens 3 are incident on the first optical member 4a. In the first optical member 4a, the incident light is condensed to a predetermined range while the direction of the incident light is converted. Here, since the incidence surface 4c of the first optical member 4a, as shown in FIG. 4A, is larger than the emission surface of the condenser lens 3, it is possible to effectively make full use of a quantity of applied light through the condenser lens 3, i.e., a quantity of applied light from the LED.

The first optical member 4a has a function to convert the direction about $\pi/2$ so as to allow the light beams incident on the incidence surface 4c to be efficiently guided to the second optical member 4b connected to the first optical member 4a. Here, the first optical member 4a is configured so as to convert the direction by using basically the total reflection surface without using a reflecting surface constituted by a metal-vapor deposited surface having a high reflectivity, which is normally, frequently used as a reflecting surface. The phenomenon of the total reflection is a phenomenon in which for the light beams traveling from a member having a high refractive index to a member having a low refractive index, an angle component beyond a critical angle in a boundary surface can be reflected at a reflectivity of 100%. Thus, in the optical system in which the total reflection is frequently used, it is possible to realize the direction conversion accompanied by a very small loss. In this embodiment, the total reflection surface 4d constituted by the continuous aspheric surface is formed in the first optical member 4a, thereby allowing the direction conversion as shown in FIG. 4B to be carried out. That is, the light beams which have been made incident on the incidence surface 4c are totally reflected on the total reflection surface 4d to be guided to the connection portion 4e with their directions being converted.

The connection portion 4e is configured in a shape of which width is narrowly reduced so as to narrow the optical path, and is connected to the second optical member 4b. The light beams which have been made incident on the second optical member 4b from the connection portion 4e, as shown in FIG. 3, travel round the second optical member 4b while they are reflected multiple times within the second optical member 4b by an operation of the second optical member 4b, and a part thereof is emitted through the emission surface (the object side) during the traveling. Thus, the shape of the connection portion 4e is designed so as to suppress it to a minimum by the operation of the second optical member 4b that the light beams, which have been made incident on the second optical member 4b from the connection portion 4e, are returned back to the first optical member 4a again, i.e., the light beams flow backward from the second optical member 4b to the first optical member 4a.

The connection portion 4e of the first optical member 4a, as shown in FIG. 3, is connected to the second optical member 4b in a tangential direction. Such connection makes it possible to efficiently guide the light beams made incident on the second optical member 4b in a circumferential direction of the second optical member 4b. Here, when a diameter of the second optical member 4b is too small, the light beams which have been made incident on the second optical member 4b becomes easy to exit to the outside the second optical member 4b. This is not preferable. In addition, when this diameter is too large more than necessary, an external appearance shape becomes too large. From such a viewpoint, a radius r (central radius) of the second optical member 4b is preferably set to a value falling within a range satisfying the following inequality:

$$10 \text{ mm} \leq r \leq 100 \text{ mm} \tag{1}$$

Here, a lower limit, 10 mm, of the radius r is a value which is set based on the fact that if the radius r becomes equal to or smaller than 10 mm, the light cannot be effectively guided. On the other hand, if the radius r exceeds an upper limit, 100 mm, an illumination optical system is unbalanced in terms of a miniature photographing apparatus. Thus, the upper limit of the radius r is set to 100 mm based on this fact.

Next, a construction in which the directions of the incident light beams are converted into the direction of the optical axis of the photographing lens in the second optical member 4b will be descried with reference to FIG. 5 to FIGS. 25A to 25D.

Figure 5:
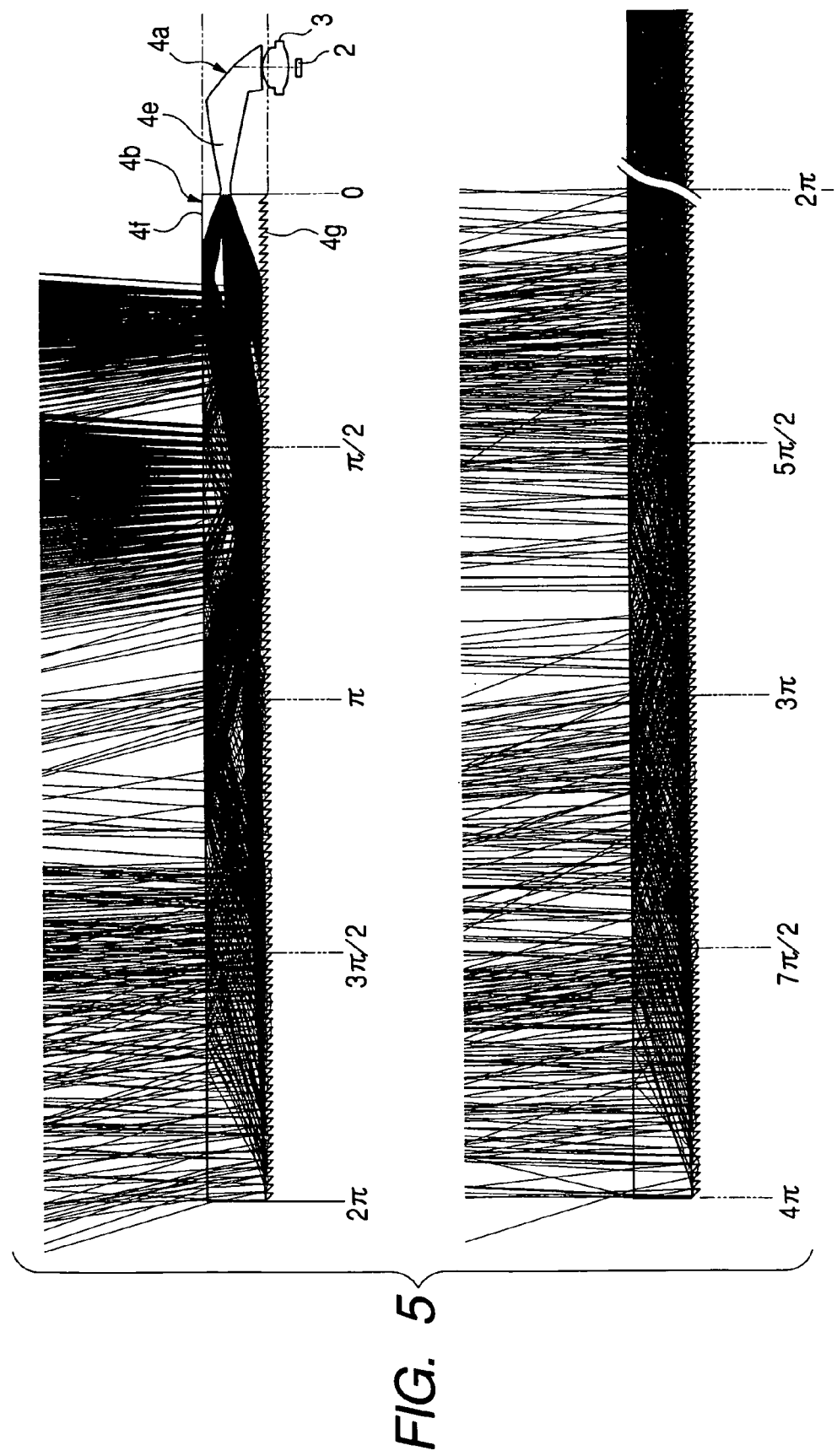
FIG. 5 is a view showing a state in which light beams made incident on a second optical member 4b are emitted through an emission surface of the second optical member 4b so as to hold a distribution corresponding to an angle of π/4 (rad) of a total reflection surface.

As a method of directing the light beams incident on the second optical member 4b along its circumferential direction toward a subject direction, a method is used in which as shown in FIG. 5, a light direction conversion surface 4g is formed in an end face facing an emission surface 4f of the second optical member 4b, and the incident light beams are reflected toward the direction of the optical axis of the photographing lens by the light direction conversion surface 4g.

The above-mentioned light direction conversion surface 4g is basically a surface which is configured by continuously disposing a plurality of prism-like portions (hereinafter referred to as "prism portions") each having a total reflection surface and a reincidence surface. Thus, of the light which has traveled through the second optical member 4b to reach a total reflection surface of one prism portion of the prism portions, only the light of a predetermined angle component is totally reflected toward the emission surface 4f by the total reflection surface. On the other hand, the light which is not totally reflected on the total reflection surface other than the light of the predetermined angle component is refracted in the one prism portion to be guided to the outside of the second optical member 4b once, and is then guided to the second optical member 4b again through the reincidence surface of a prism portion next to the one prism portion.

Next, four different shapes of the light direction conversion surface 4g will be collaterally described in order to describe an ideal shape of the light direction conversion surface 4g.

A basic element in the four different shapes is an angle of the total reflection surface of each prism portion in the light direction conversion surface 4g. Here, the angle of the total reflection surface is supposed to be expressed as an angle with respect to the emission surface 4f. FIG. 5 to FIGS. 10A to 10F show a case where the angle of the total reflection surface of the light direction conversion surface 4g is fixed to $\pi/4$ (rad). FIG. 11 to FIGS. 15A to 15F, FIG. 16 to FIGS. 20A to 20F, and FIG. 21 to FIGS. 25A to 25D show a state in a case where the angle of the total reflection surface is 2π/9 (rad), 7π/36 (rad), and π/6 (rad), respectively.

First of all, FIGS. 5, 11, 16 and 21 are views showing states in which the light beams which have been made incident on the second optical member 4b is emitted through the emission surface of the second optical member 4b so as to hold the distributions corresponding to the respective angles of the total reflection surfaces. In order to make the description simple, the second optical member 4b is linearly developed to show the loci of the light beams corresponding to the respective angles of the total reflection surfaces. The locus of the light beam in this case depends on the angle of the reflection surface, the position of the connection portion 4e between the first and second optical members 4a and 4b, and the light beam distribution up to the connection portion 4e.

As for a feature of this embodiment, a point is given in which the light beams which have been incident on the second optical member 4b from the LED 2 through the condenser lens 3 and the first optical member 4a travel round the second optical member 4b while the light beams are reflected within the second optical member 4b to be finally directed toward the direction of the optical axis of the photographing lens. In the examples shown in the drawings, in order to simply describe this state, the positions of the second optical member 4b in a circumferential direction are expressed with the position of the connection portion 4e as an angle of 0 (rad). In particular, in this embodiment, there are shown the loci of the optical beams up to the position of the second circuit, i.e., 4π (rad). While of course, the light beams exist which travel round the second optical member 4b three or more times, since the feature of this optical system can be sufficiently described with the light beams up to the position of the second circuit, the light beams exist which travel round the second optical member 4b three or more times is omitted.

First of all, a description will now be given with respect to the light direction conversion surface 4g which is most characteristic in the illumination optical system of the present invention.

As described above, the light direction conversion surface 4g is a surface which is configured by continuously disposing a plurality of prism portions each having a total reflection surface and a reincidence surface. By the operation of the light direction conversion surface 4g, the traveling directions of the light beams within the second optical member 4b are regulated in one direction, and only the predetermined angle component is totally reflected. Then, the light beams other than the predetermined angle component are refracted to be emitted to the outside of the second optical member 4b once, and is then made incident on the second optical member 4b again to travel within the second optical member 4b.

Heretofore, the illumination optical system called the normal surface illuminant is constructed so that a surface facing an emission surface is formed as a diffusion surface such as a white dot printed pattern, a necessary quantity of light is diffused by the diffusion surface, and after light beams emitted from an optical member are reflected by a reflecting plate, the light beams are emitted through the emission surface. With this configuration, since a diffusion operation for converting the directions of the light beams is required, a large light quantity loss occurs.

On the other hand, in this embodiment, since the direction of the light beams is converted by the total reflection in the second optical member 4b, the highly efficient direction conversion is made possible without occurrence of a large light quantity loss. Of the incident light beams, only the light beams meeting the condition are totally reflected to be emitted through the emission surface 4f, while the light beams not meeting the condition are effectively utilized again by the refraction operation. Thus, a loss rate of the given light energy can be remarkably reduced.

FIG. 5 shows the case where the angle of the total reflection surface of the light direction conversion surface 4g is steepest, i.e., π/4 (rad). In the case of this angle setting, as shown in FIG. 5, the light beams can be emitted nearly at a right angle with respect to the emission surface 4f. In addition, as for the other feature, there are a point in which a bright portion (the distribution of the light beam is dense) is concentrated on the vicinity of the incidence portion in the second optical member 4b, and a point in which the areas having different brightness corresponding to a partially bright portion and a dark portion are alternately formed.

A fact that the bright portions are concentrated on the vicinity of a connection portion (a connection portion to the connection portion 4e) between the first and second optical members 4a and 4b results from that the light beams covering a considerably wide angle range exist in the light beams which have been just made incident from the first optical member 4a, and hence the components each having a relatively large angle with respect to the light guide direction are intensively emitted through the vicinity of the connection portion. In addition, a fact that the high intensity and low intensity of the emission light beams periodically appear in the vicinity of the incidence portion results from that a width of the light beams made incident on the connection portion 4e is narrower than that of the ring-like second optical member 4b, and hence the light beams are made incident only on a part of the ring-like second optical member 4b, and is due to a characteristic depending on position in the second optical member 4b where the connection portion 4e is connected to. This characteristic is most remarkable in the case of the angle of π/4 (rad) shown in FIG. 5.

Figure 11:
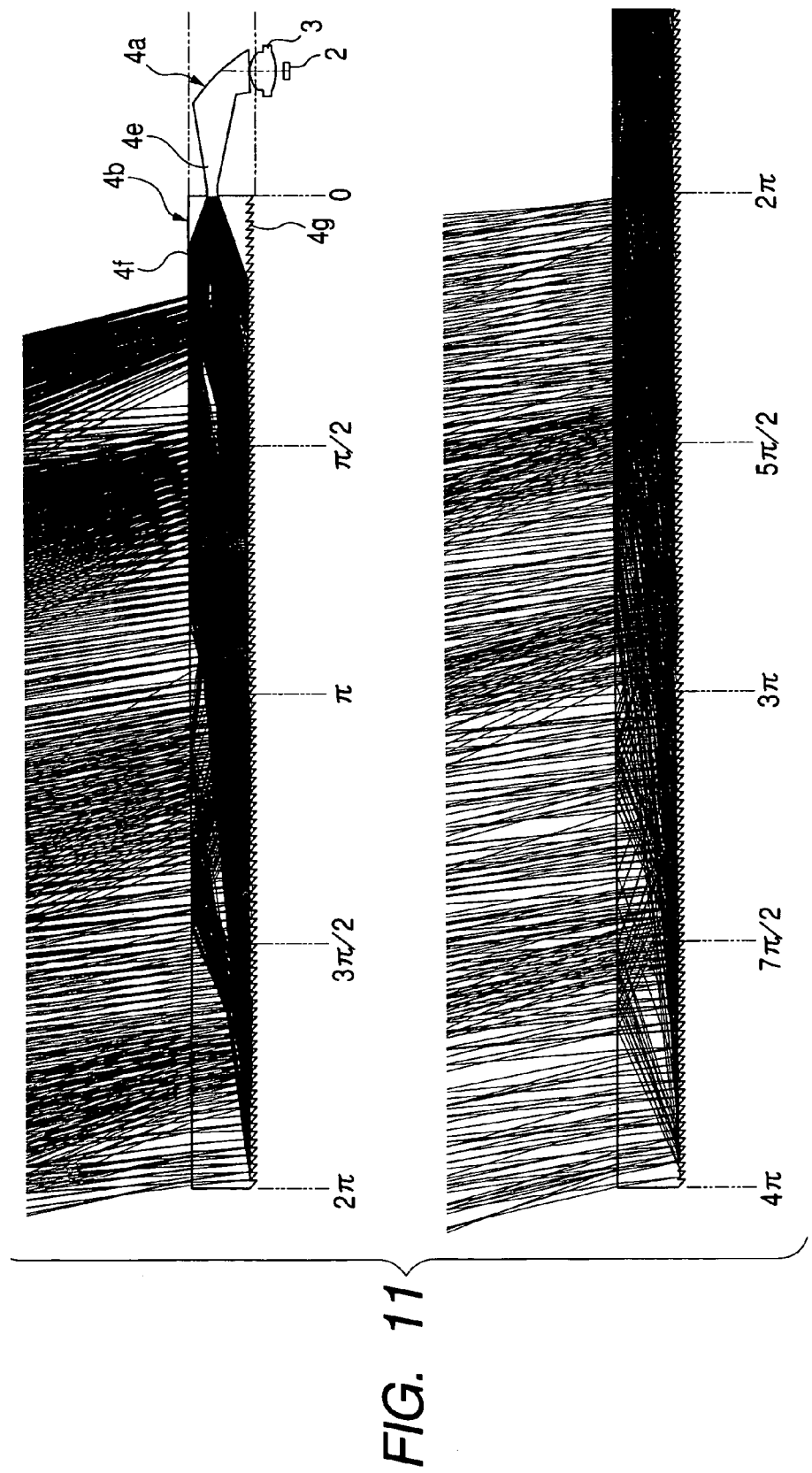
FIG. 11 is a view showing a state in which light beams made incident on a second optical member 4b are emitted through the emission surface of the second optical member 4b so as to hold a distribution corresponding to an angle of 2π/9 (rad) of the total reflection surface.
Figure 16:
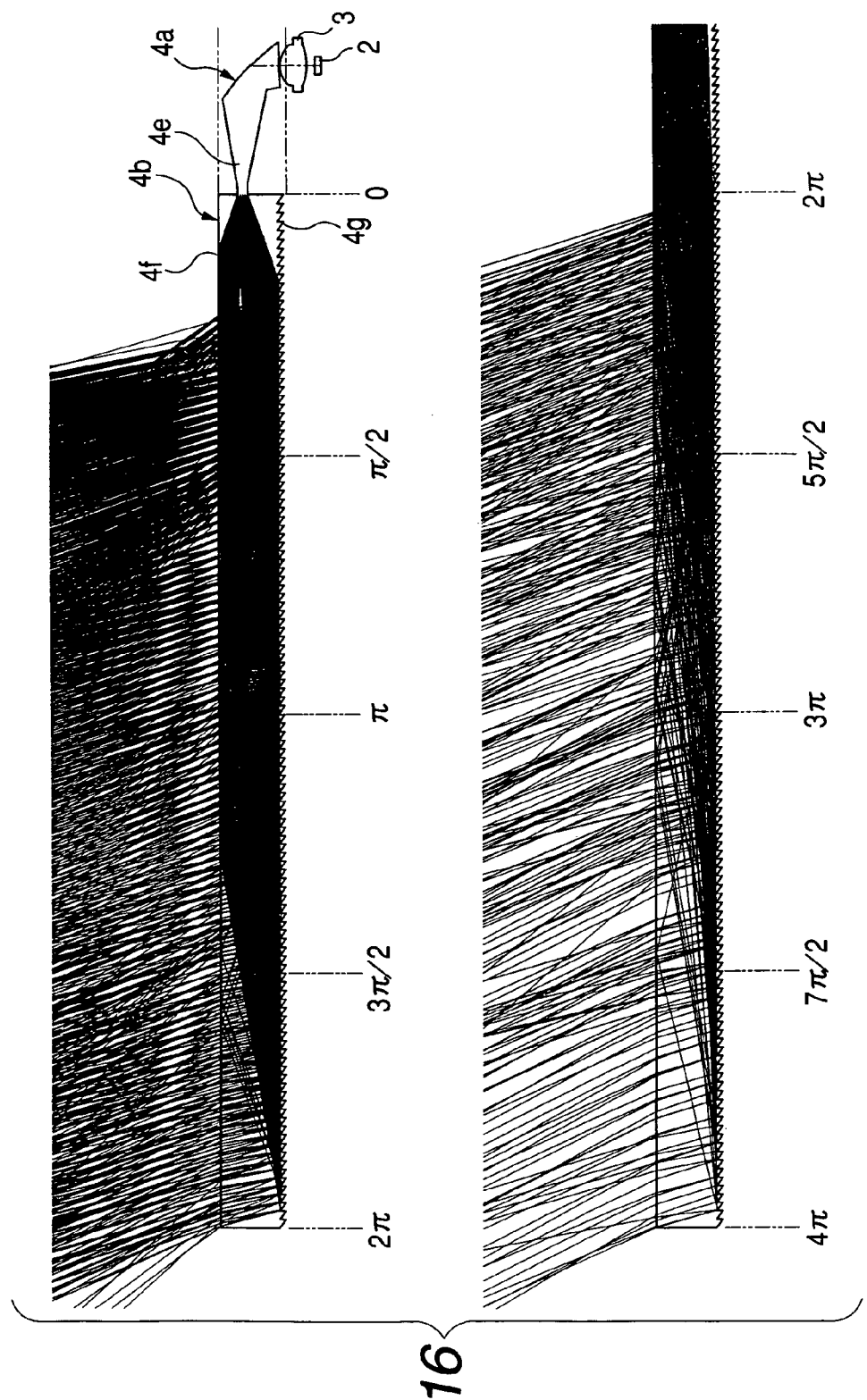
FIG. 16 is a view showing a state in which light beams made incident on the second optical member 4b are emitted through the emission surface of the second optical member 4b so as to hold a distribution corresponding to an angle of 7π/36 (rad) of a total reflection surface.
Figure 21:
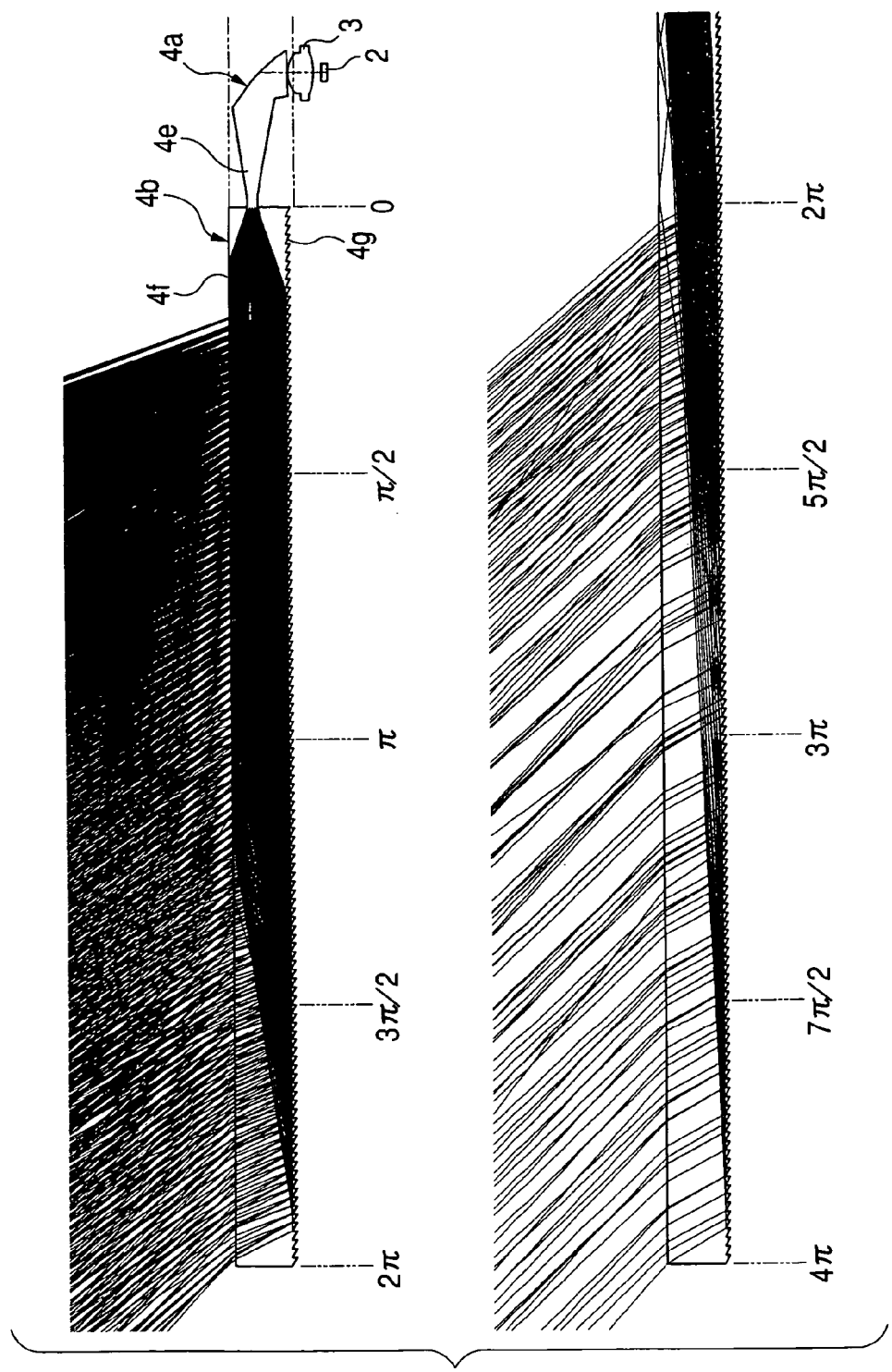
FIG. 21 is a view showing a state in which light beams made incident on a second optical member 4b are emitted through the emission surface of the second optical member 4b so as to hold a distribution corresponding to an angle of π/6 (rad) of a total reflection surface.

In addition, as shown in FIGS. 11, 16 and 21, this characteristic has a tendency to be further relaxed as the angle of the total reflection surface becomes gentler (smaller). Also, as apparent from FIGS. 5, 11, 16 and 21, the angles of the light beams emitted through the emission surface 4f inclines with respect to the emission surface 4f as the angle of the total reflection surface becomes gentler. In the normal illumination apparatus, this inclination of the illumination directions becomes a problem. However, in the ring light for macro photographing of this embodiment, the second optical member 4b has a ring-like shape, and hence if only the emission directions of the light beams emitted through the respective positions of the emission surface 4f are nearly constant, the light beams emitted through the respective positions serve to complement each other. Thus, even if the optical axes of the emission light beams incline with respect to the optical axis of the photographing lens to some degree, more uniform illumination can be carried out using the light beams emitted through the whole emission surface 4f of the second optical member 4b. Consequently, that inclination of the illumination directions does not become a serious problem.

In addition, as apparent from FIGS. 5, 11, 16 and 21, though such a discontinuous intensity change appears in the vicinity of the connection portion 4e, the light beams can be uniformly emitted nearly in a fixed emission direction in other positions.

Next, a description will be given with respect to the efficiency when the angle of the total reflection surface of the light direction conversion surface 4g differs.

When the angle of the total reflection surface of the light direction conversion surface 4g is changed, a ratio of the number of light beams emitted through the emission surface 4f to the number of light beams made incident on the connection portion 4e is as follows.

First of all, when the angle of the above-mentioned total reflection surface is π/4 (rad), it is possible to emit light beams the ratio of the number of which is 43% by the end of first circuit and is 68% by the end of second circuit with respect to the number of incident light beams. In addition, when the angle of the total reflection surface is 2π/9 (rad), the ratio of the number of emission light beams to the number of incident light beams becomes 56% by the end of first circuit and 82% by the end of second circuit. When the angle of the total reflection surface is 7π/36 (rad), the ratio of the number of emission light beams to the number of incident light beams becomes 68% by the end of first circuit and 90% by the end of second circuit. When the angle of the total reflection surface is π/6 (rad), the ratio becomes 84% by the end of first circuit and 92% by the end of second circuit. Thus, it shows that the light beams can be more efficiently emitted in the small number of times of the circuits as the angle of the total reflection surface is set smaller in such a manner. In addition, it also shows that when the angle of the total reflection surface is set to π/6 (rad), the light beams are emitted in the first circuit over nearly all the quantity of emitted light.

As described above, in this embodiment, an improvement of efficiency of the light beam is realized by using the total reflection. However, since the second optical member 4b is made of an optical resin material, if the optical path inside of the second optical member 4b is too long, the efficiency is influenced by a transmittance of the optical resin material to be reduced. Consequently, it may safely be said from the above-mentioned condition that the smaller angle is desirable as the angle of the total reflection surface. On the other hand, as described above, if the angle of the total reflection surface is made small, the emission angle with respect to the emission surface 4f becomes large. If the emission angle with respect to the emission surface 4f becomes too large, the emission light beams in the positions along the circumferential direction of the emission surface 4f cannot complement each other. Thus, it may not safely be said that an ideal illumination is carried out.

The property of the light direction conversion surface 4g will hereinafter be described in more detail with reference to FIGS. 6, 12, 16 and 22.

A portion adapted to serve as a light emitting point in the second optical member 4b, as apparent from FIGS. 5, 11, 16 and 21, is only the vicinity (a part of the total reflection surface) of a bottom portion of each prism portion of the light direction conversion surface 4g. Each of FIGS. 6, 12, 16 and 22 shows a situation of the traveling of the light beams in typical eight points of the above-mentioned light emitting points. Each of FIGS. 6, 12, 16 and 22, in order to make the description simple, shows the light beams which are reflected and emitted in the vicinities (parts of the total reflection surfaces) of the bottom portions of the prism portions corresponding to the eight points located at intervals of π/4 (rad) from π/2 (rad) to 4π (rad) which are typical examples of the light emitting points on the assumption that a light source having a uniform angle distribution exists in the position (connection portion) expressed by 0 (rad). From this, it will become possible to understand the details of the operation of the light beams in the total reflection surface of each light emitting point.

Figure 6:
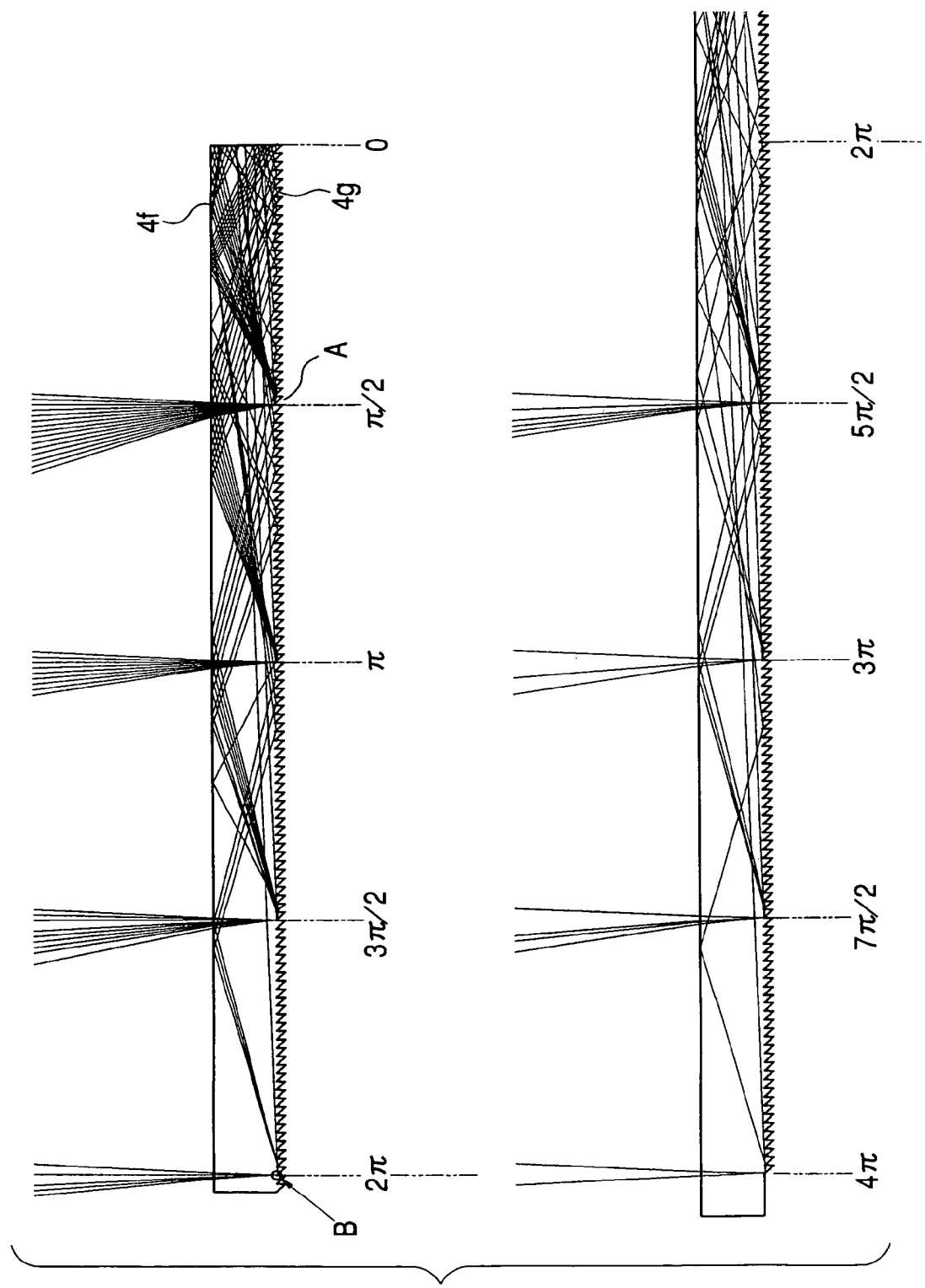
FIG. 6 is a view showing a state of traveling of light beams in typical eight light emitting points of light emitting points shown in FIG. 5.

First of all, when the angle of the total reflection surface is π/4 (rad) as shown in FIG. 6, in the light emitting point (a position corresponding to π/2 (rad)) near the light source (a position corresponding to 0 (rad)), a range of the illumination angle is wide, and hence there is a large number of light beams. In addition, in the light emitting point (the position corresponding to π/2 (rad)), light beams having components of a relatively large angle with respect to the emission surface 4f are emitted therefrom. In addition, in the light emitting point more distant from the light source (the position corresponding to 0 (rad)), the number of emission light beams decreases, and only light beams having components of an angle near a right angle with respect to the emission surface 4f are left to be emitted.

Figure 12:
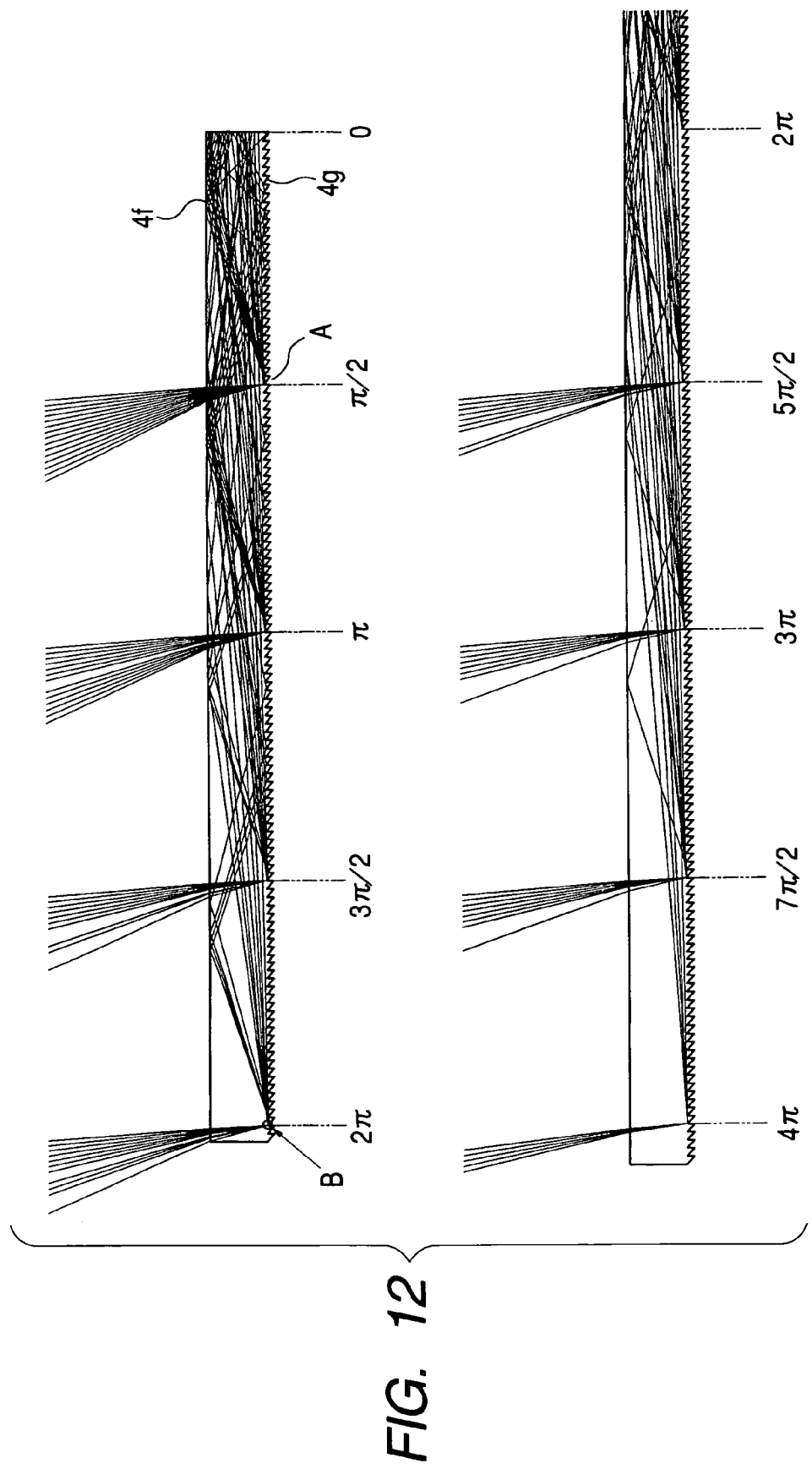
FIG. 12 is a view showing a state of traveling of light beams in typical eight light emitting points of light emitting points shown in FIG. 11.

Next, when the angle of the total reflection surface is 2π/9 (rad) as shown in FIG. 12, it is understood that the light beams are totally emitted with being a slightly inclined with respect to a perpendicular of the emission surface 4f. In addition, it is also understood that while the range of the irradiation angle has the same tendency as that in the case shown in FIG. 6, a distribution of the emission light beams in a position near the light source becomes narrow, a certain measure of a distribution of the irradiation range is obtained even in the position distance from the light source, and hence there is no abrupt change.

Figure 17:
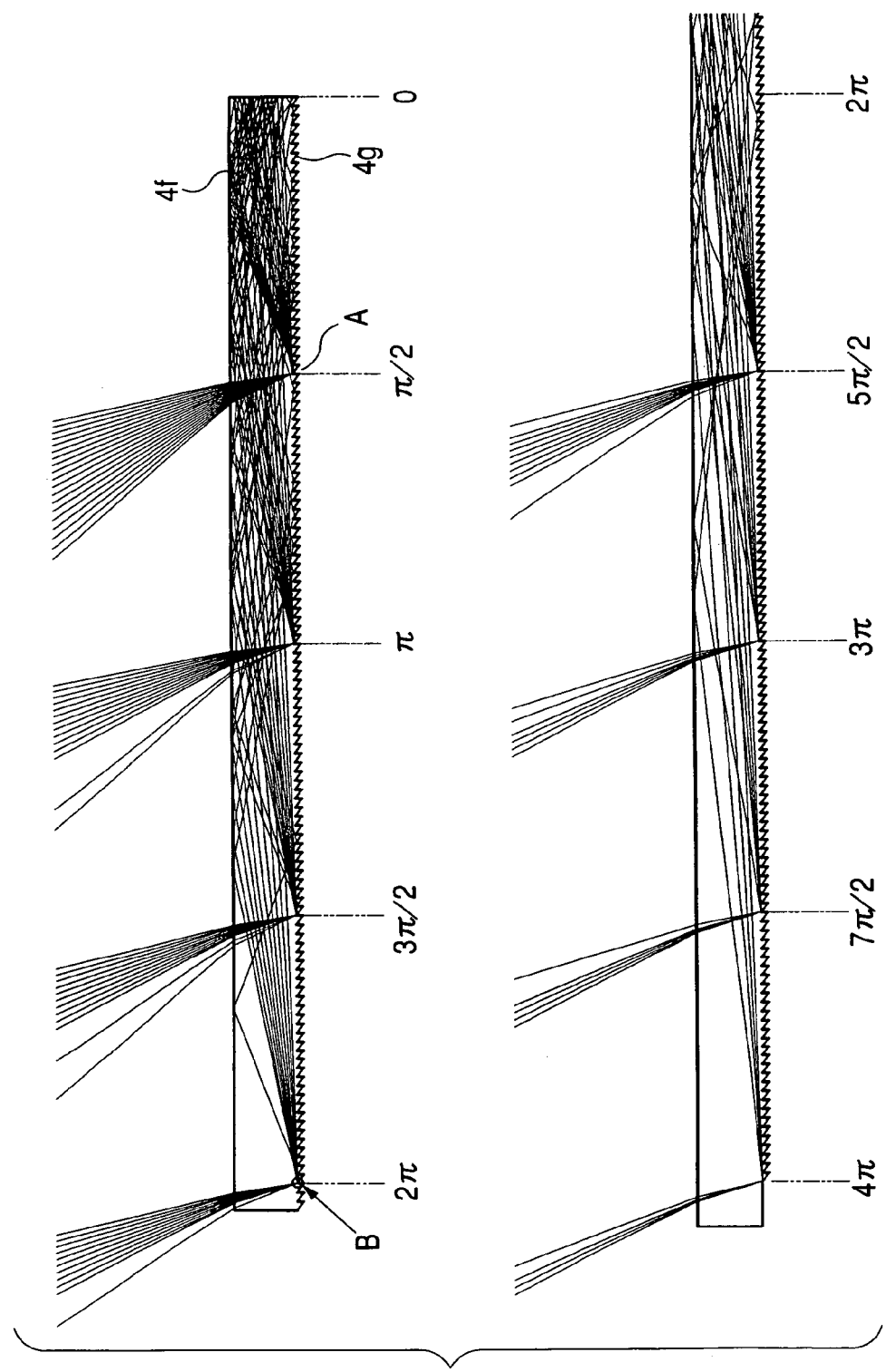
FIG. 17 is a view showing a state of traveling of light beams in typical eight emitting points of light emitting points shown in FIG. 16.
Figure 22:
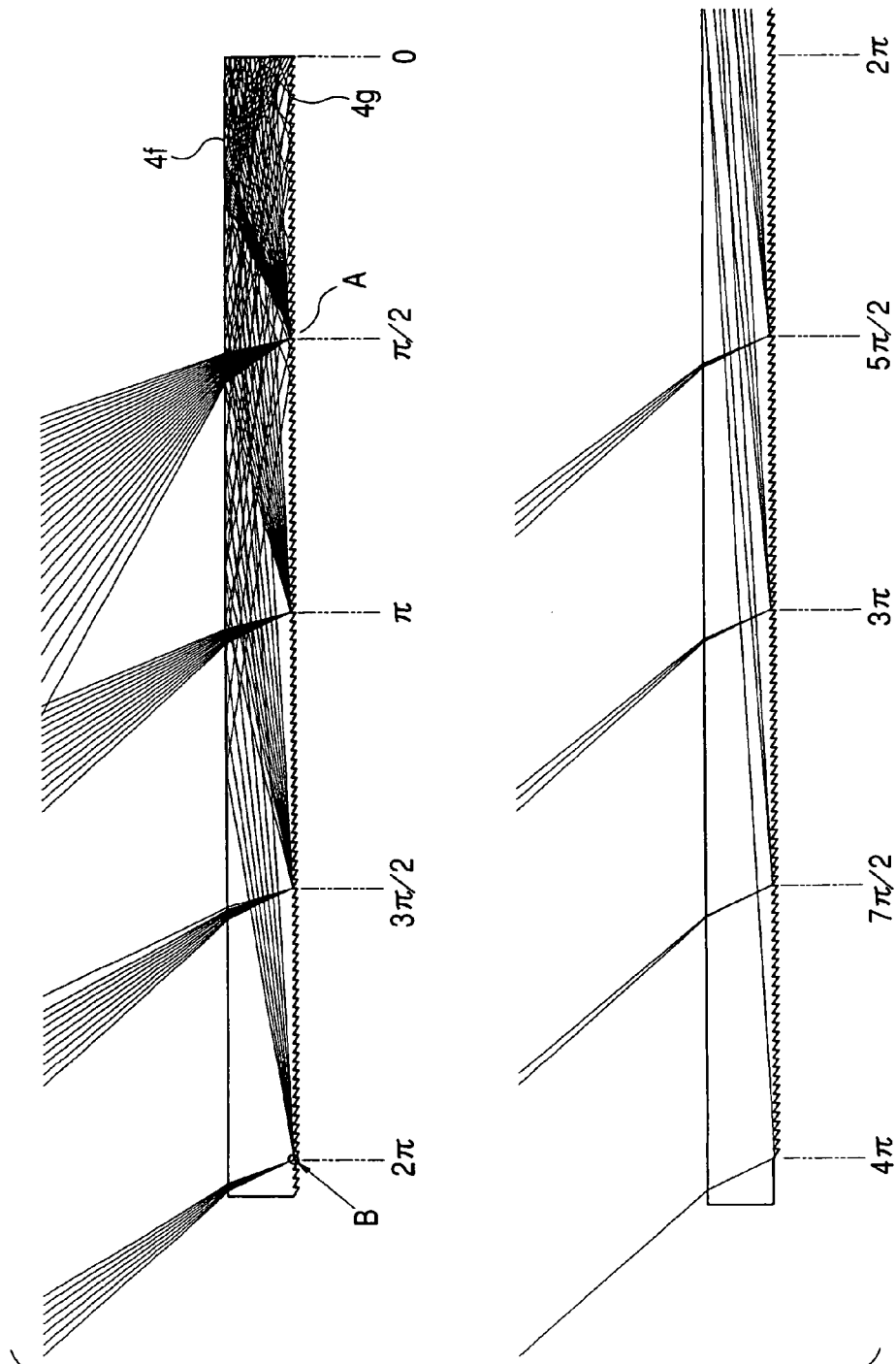
FIG. 22 is a view showing a state of traveling of light beams in typical eight light emitting points of light emitting points shown in FIG. 21.
Figure 23A:
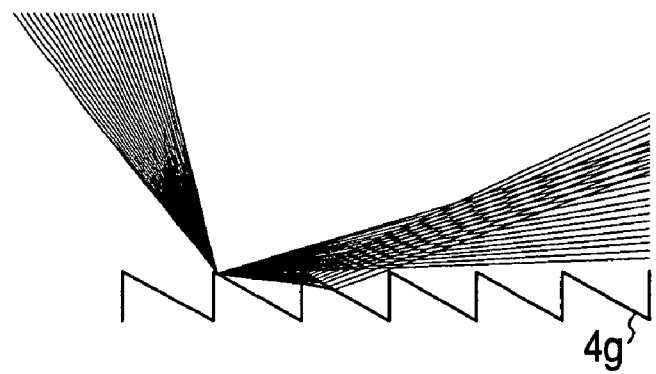
FIGS. 23A, 23B, and 23C are views each showing a state of light beams in a total reflection surface at a point (a point A in FIG. 22) near a light source side.
Figure 23B:
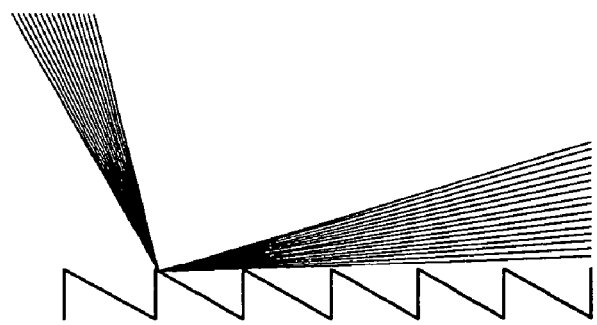
Figure 23C:
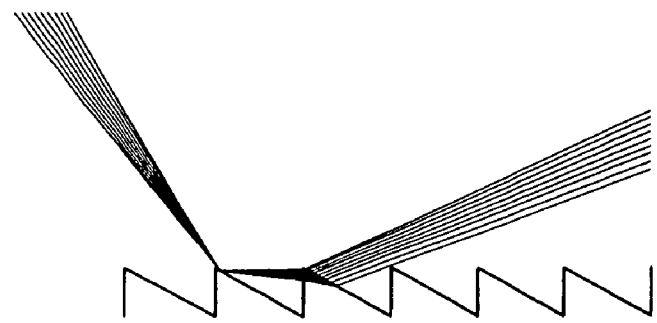
Figure 24:
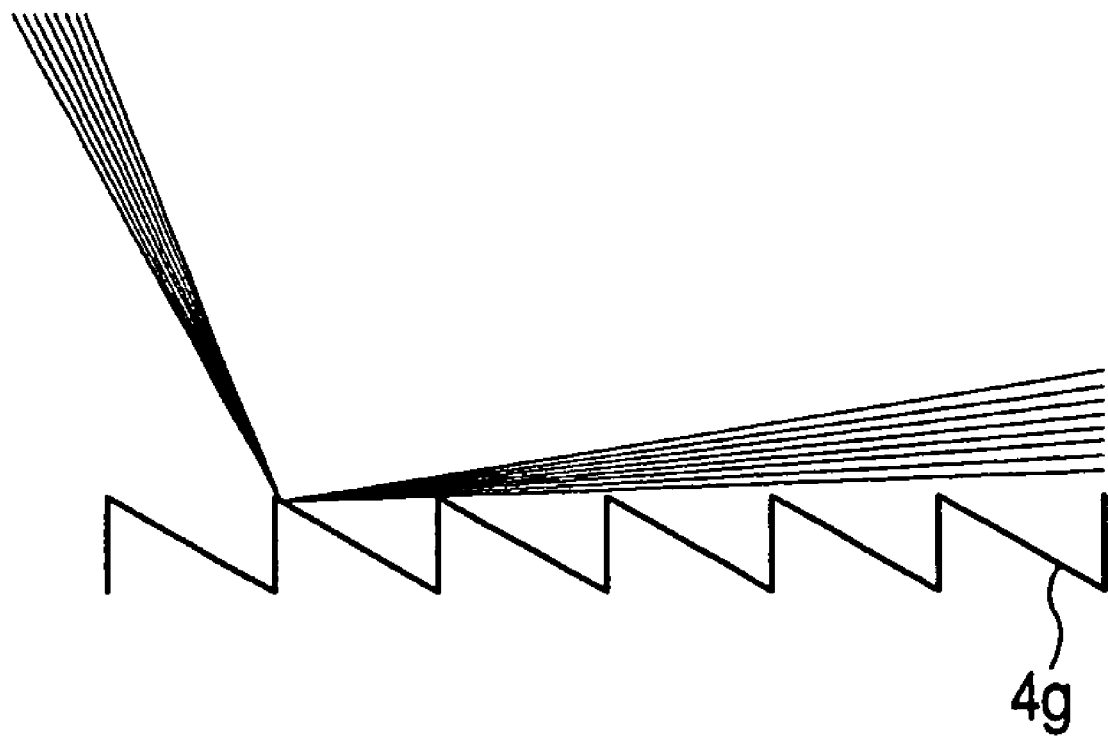
FIG. 24 is a view showing a state of light beams in a total reflection surface at a point (a point B in FIG. 22) distant from the light source.
Figure 25A:
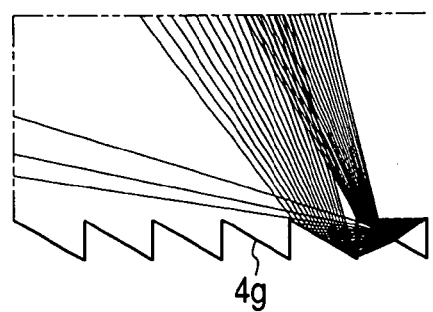
FIGS. 25A, 25B, 25C, and 25D are views each schematically showing a state of reflection and refraction of reutilized light beams in a position near the light source when an angle of a total reflection surface is π/6 (rad)
Figure 25B:
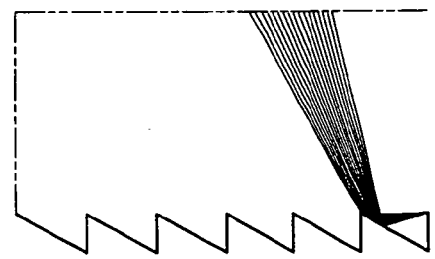
Figure 25C:
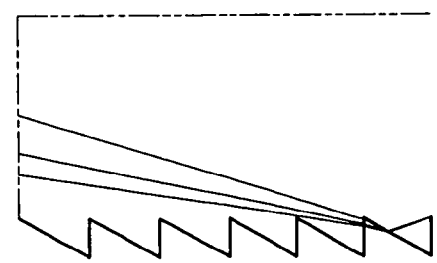
Figure 25D:
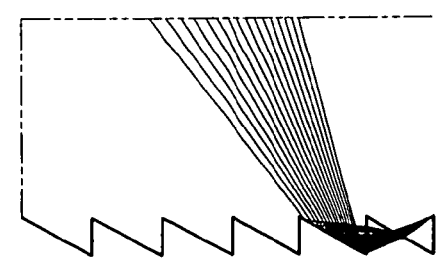

Moreover, when the angle of the total reflection surface is 7π/36 (rad) as shown in FIG. 17, and when the angle of the total reflection surface is π/6 (rad) as shown in FIG. 22, it is understood that the emission light beams in whole inclines larger with respect to a perpendicular of the emission surface 4f. In addition, it is also understood that with respect to the distribution of the emission light beams, a large number of light beams having different angle components exist in the light emitting point near the light source side. The more distant from the position of the light source, the more the number of light beams extremely decreases.

Figure 18A:
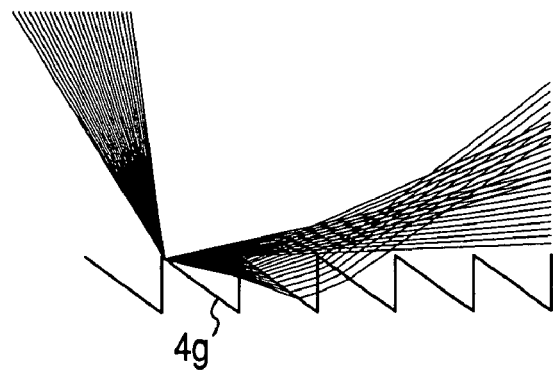
FIGS. 18A, 18B, 18C, and 18D are views each showing a state of light beams in a total reflection surface at a point (a point A in FIG. 17) near a light source side.
Figure 18B:
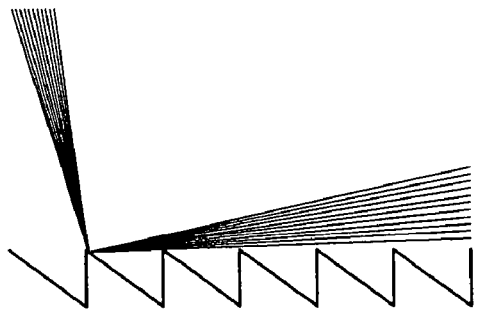
Figure 18D:
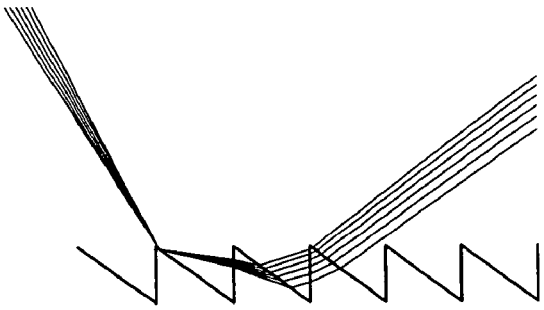
Figure 18C:
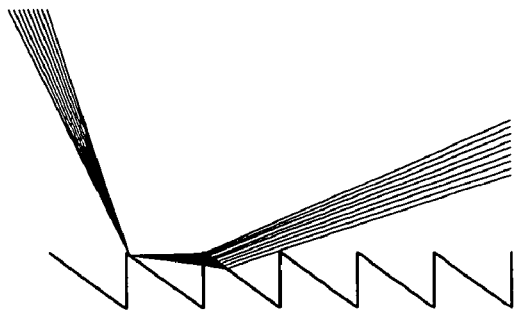
Figure 19:
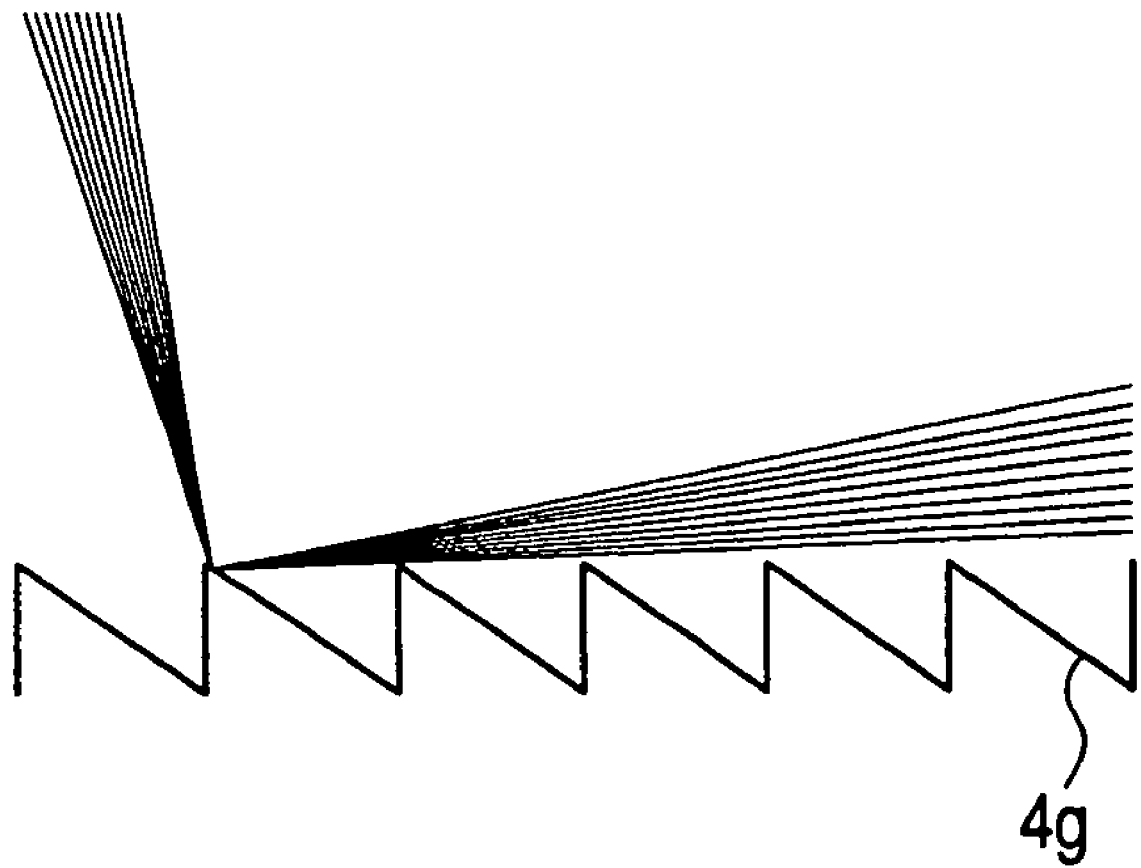
FIG. 19 is a view showing a state of light beams in a total reflection surface at a point (a point B in FIG. 17) distant from the light source.
Figure 20A:
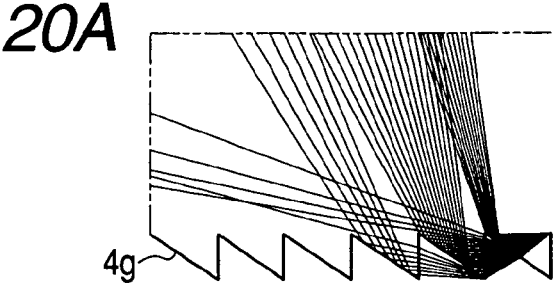
FIGS. 20A, 20B, 20C, 20D, 20E, and 20F are views each schematically showing a state of reflection and refraction of reutilized light beams in a position near the light source when an angle of a total reflection surface is 7π/36 (rad)
Figure 20B:
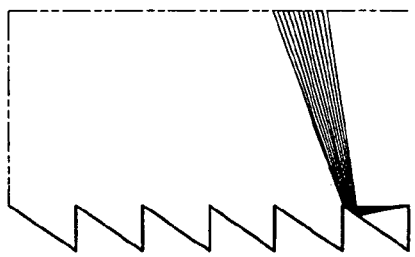
Figure 20F:
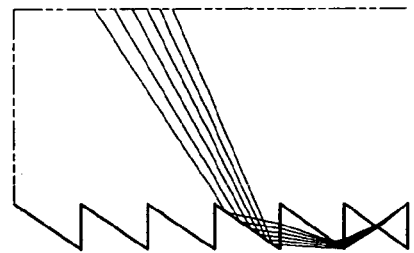
Figure 20C:
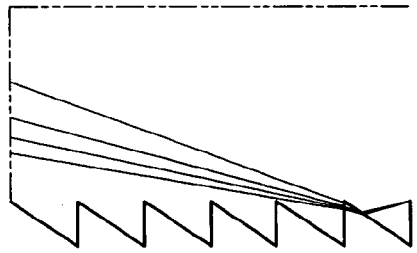
Figure 20D:
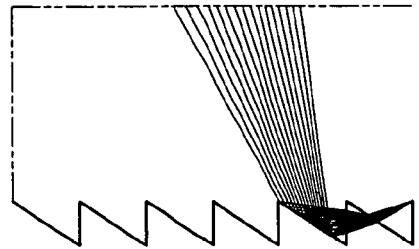
Figure 20E:
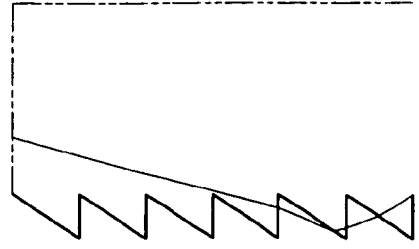

Next, states of the light beams in the total reflection surfaces in the light emitting point (a point A in the drawings) nearer the light source and the light emitting point (a point B in the drawings) distant from the light source of the typical light emitting points shown in each of FIGS. 6, 12, 17 and 22 will be described with reference to FIGS. 7A to 7E, FIGS. 8A to 8C, FIGS. 13A to 13D, FIGS. 14A to 14C, FIGS. 18A to 18D, FIG. 19, FIGS. 23A to 23C and FIG. 24. Here, each of FIGS. 7, 13, 18 and 23 shows a state of the light beams in the total reflection surface in the light emitting point (the point A in each of FIGS. 6, 12, 17 and 22) near the light source, while each of FIGS. 8A to 8C, FIGS. 14A to 14C, FIG. 19 and FIG. 24 shows a state of the light beams in the total reflection surface in the light emitting point (the point B in each of FIGS. 6, 12, 17 and 22) distant from the light source. Then, each of FIGS. 7A, 13A, 18A and 23A shows all the light beams which can be emitted in the light emitting point A near the light source, while each of FIGS. 8A, 14A, 19 and 24 shows all the light beams which can be emitted in the light emitting point B distant from the light source. In addition, FIGS. 7B, 8B, 13B, 14B, 18B and 23B show the light beams which are reflected and not refracted among the light beams shown in FIGS. 7A, 8A, 13A, 14A, 18A and 23A, respectively. In addition, FIGS. 7C, 8C, 13C, 14C, 18C and 23C show the light beams which are refracted once and reflected among the light beams shown in FIGS. 7A, 8A, 13A, 14A, 18A and 23A, respectively. Also, FIGS. 7D, 13D and 18D show the light beams which are refracted twice and reflected among the light beams shown in FIGS. 7A, 13A and 18A, respectively. Also, FIG. 7E shows the light beams, each of which is refracted three times and reflected, among the light beams shown in FIG. 7A. Here, the light beams shown in the drawings are only components which are emitted through the emission surface 4f.

Figure 7A:
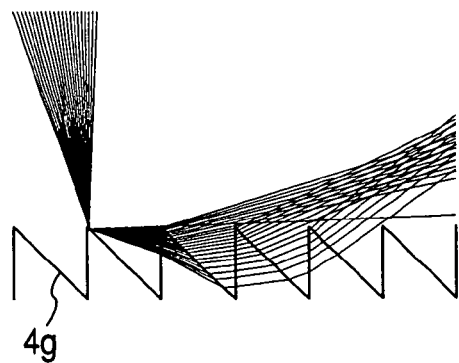
FIGS. 7A, 7B, 7C, 7D, and 7E are views each showing a state of light beams in a total reflection surface at a point (a point A in FIG. 6) near a light source side.
Figure 7B:
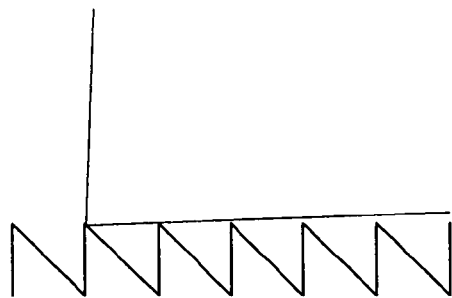
Figure 7D:
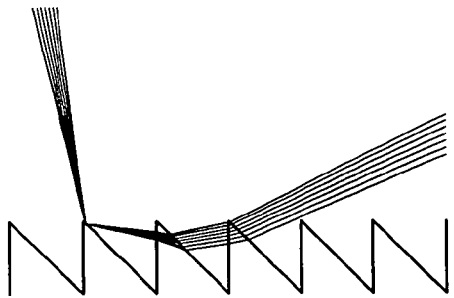
Figure 7C:
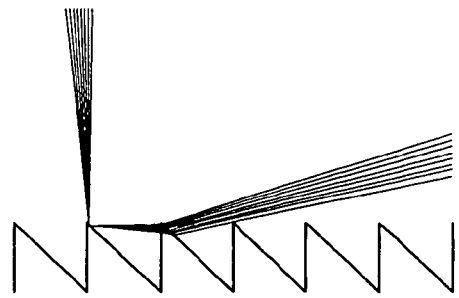
Figure 7E:
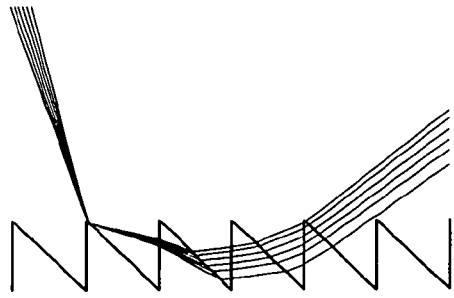

When the angle of the reflecting surface is π (rad), with respect to the light beams reflected on the reflecting surface in the position near the light source, as shown in FIG. 7A, the light beams having components over a wide range of a component making nearly a right angle with the emission surface 4*f* to a component making a predetermined angle with the emission surface 4*f* continuously exist. Here, as shown in FIG. 7B, the component which is reflected and not refracted becomes a component making a most nearly right angle with respect to the emission surface 4*f*, and as shown in FIG. 7C, the component which is refracted once and reflected becomes a component making a secondly most nearly right angle with respect to the emission surface 4*f*. Also, as shown in FIGS. 7D and 7E, the component which is refracted twice and reflected, the component which is refracted three times and reflected, and the like have larger angles with respect to a perpendicular of the emission surface 4*f* as the number of times of the refraction increases. Moreover, when the light source has a uniform angle distribution, it becomes more remarkable that the components continuously exist in a position in the vicinity of the light source.

Figure 8A:
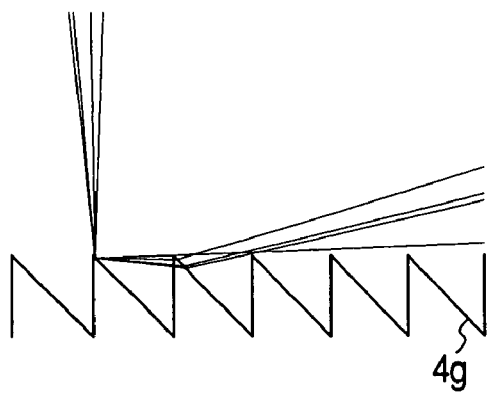
FIGS. 8A, 8B, and 8C are views each showing a state of light beams in a total reflection surface at a point (a point B in FIG. 6) distant from the light source.
Figure 8B:
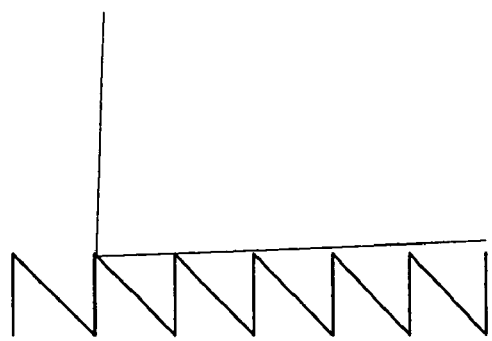
Figure 8C:
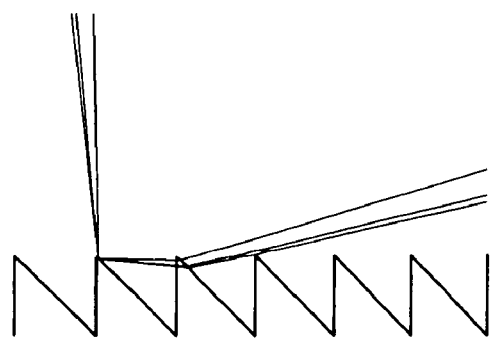

On the other hand, with respect to the light beams which are reflected on the reflecting surface in the position distant from the light source, as shown in FIG. 8A, while a component exists which makes nearly a right angle with the emission surface 4*f*, a component does not exist which makes a certain angle with the emission surface 4*f*. Moreover, in the distribution of the light beams, the light beams do not continuously exist. In addition, as apparent from FIGS. 8B and 8C, only a component which is reflected and not refracted, and a component which is refracted once and reflected exist, and any component refracted three or more times and reflected does not exist.

Next, a description will be given with respect to the case where the angles of reflecting surface are 2π/9 (rad), 7π/36 (rad) and π/6 (rad), respectively.

The cases of those angles, as shown in FIGS. 13A to 13D, FIGS. 14A to 14C, FIGS. 18A to 18D, FIG. 19, FIGS. 23A to 23C and FIG. 24, show the same tendency as that in the case of the total reflection surface having the angle of π/4 (rad) (shown in FIGS. 7A to 7E and FIGS. 8A to 8C). However, those cases are different from the case of the total reflection surface having the angle of π/4 (rad) in that the inclination of the whole distribution of the emission light beams becomes gradually larger with respect to the perpendicular of the emission surface as the angle of the total reflection surface becomes smaller, and in that the number of times of the refraction gradually decreases as the angle of the total reflection surface becomes smaller. In addition, it is understood from FIGS. 13A to 13D, FIGS. 14A to 14C, FIGS. 18A to 18D, FIG. 19, FIGS. 23A to 23C, and FIG. 24 that the number of components which are emitted from the emission surface 4*f* only through the total reflection and not refracted gradually increases as the angle of the total reflection surface becomes smaller. As described above, as the number of components which directions are converted by the refraction is smaller, the number of light quantity loss components due to the surface reflection accompanying the incidence/emission to/from the refraction portion decreases, and hence the utilization efficiency of the light beams can be improved, which results in that the illumination optical system can be configured which is excellent in efficiency in terms of the optical characteristics.

While above, the components have been shown which are emitted through the emission surface 4*f*, in this embodiment, any of the light beams not meeting the emission condition can be reutilized. An algorithm for the reutilization of the light beams, and a situation in which substantially all the light beams are effectively utilized will hereinafter be described with reference to FIGS. 9A to 9H, FIGS. 15A to 15F, FIGS. 20A to 20F and FIGS. 25A to 25D. FIGS. 9A to 9H, FIGS. 15A to 15F, FIGS. 20A to 20F, and FIGS. 25A to 25D are views schematically showing the reflection state and the refraction state of the light beams which are reutilized in the position near the light source when the angles of the total reflection surface are π/4 (rad), 2π/9 (rad), 7π/36 (rad), and π/6 (rad), respectively.

Figure 9A:
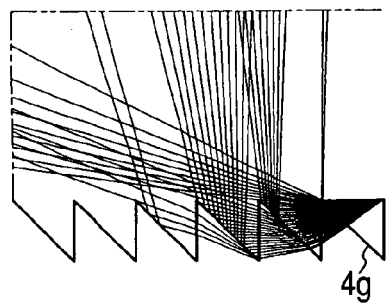
FIGS. 9A, 9B, 9C, 9D, 9E, 9F, 9G, and 9H are views each schematically showing a state of reflection and refraction of reutilized light beams in a position near the light source when an angle of a total reflection surface is π/4 (rad)
Figure 9B:
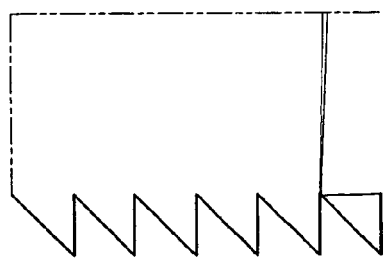
Figure 9F:
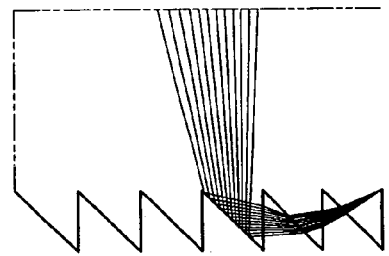
Figure 9C:
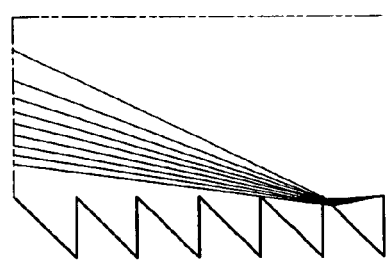
Figure 9G:
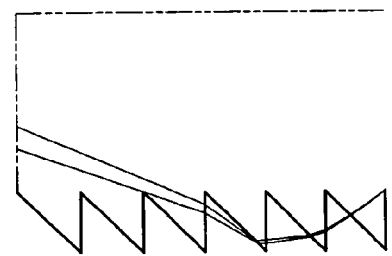
Figure 9D:
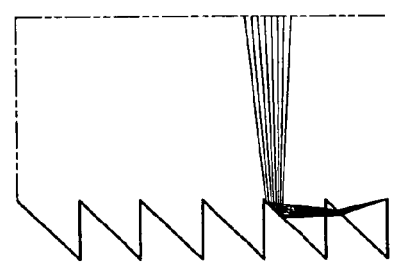
Figure 9H:
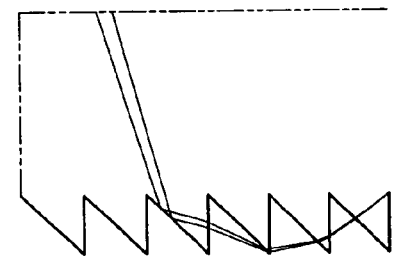
Figure 9E:
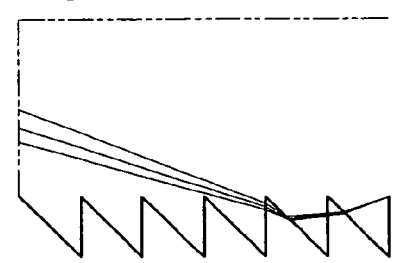
Figure 10A:
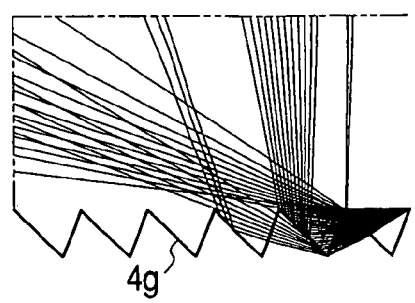
FIGS. 10A, 10B, 10C, 10D, 10E, and 10F are views each schematically showing a state of reflection and refraction of reutilized light beams in a position near the light source when an angle of a total reflection surface is π/4 (rad), and an angle of a reincidence surface is 7π/18 (rad)
Figure 10B:
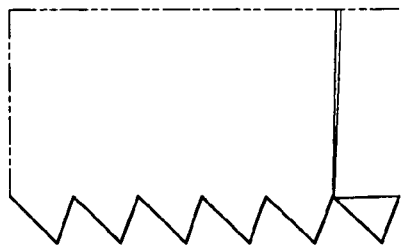
Figure 10F:
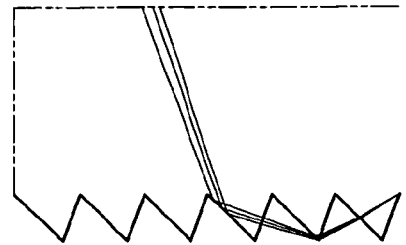
Figure 10C:
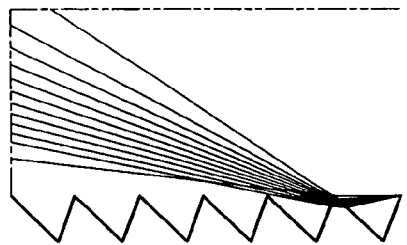
Figure 10D:
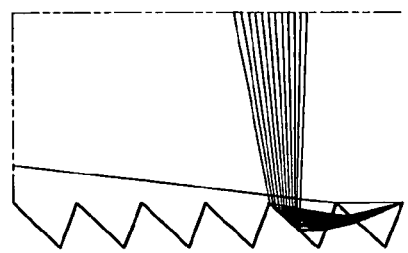
Figure 10E:
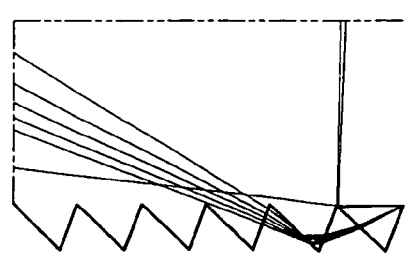

First of all, the case where the angle of the total reflection surface is π/4 (rad) will now be described with reference to FIG. 9A to 9H. FIG. 9A shows all the possible light beams in the case where the angle of the total reflection surface is π/4 (rad). As for the light beams, there are the components which are reflected by the total reflection surfaces of the light direction conversion surface 4*g* to be emitted, and the components which travel within the second optical member 4*b* again through the refraction in the light direction conversion surface 4*g*. Here, of the light beams emitted from the bottom portion of the light direction conversion surface 4*g* as the light emitting point, the component having the smallest angle with respect to the light guide direction, as shown in FIG. 9B, is totally reflected on the total reflection surface of the first prism portion located in the rear thereof to be guided to the emission surface 4*f*. In addition, the component having the second smallest angle with respect to the light guide direction, as shown in FIG. 9C, is refracted in the first prism located in the rear thereof and is then made incident on the second optical member 4*b* again to continue to travel through the second optical member 4*b*. In addition, the component having the third smallest angle with respect to the light guide direction, as shown in FIG. 9D, is refracted in the first prism portion located in the rear thereof, and is then made incident on the second optical member 4*b* again, and is then totally reflected on the total reflection surface of the next prism portion to be guided to the emission surface 4*f*. Moreover, the component having the fourth smallest angle with respect to the light guide direction, as shown in FIG. 9E, is refracted in the first prism portion located in the rear thereof, and in the secondly located prism portion, respectively, and is then made incident on the second optical member 4*b* again to continue to travel through the second optical member 4*b*. In each of the cases as well shown in FIGS. 9F to 9H, similarly to the above-mentioned cases, the component having a corresponding angle with respect to the light guide direction is refracted predetermined times, and is then made incident on the second optical member 4*b* again to continue to travel through the second optical member 4*b*.

In such a manner, the light beams emitted from the vicinity (the end point of the total reflection surface) of the bottom portion of the prism portion of the light direction conversion surface 4*g* as the light emitting point, are divided into the light beams directed toward the emission surface 4*f*, and the light beams continuing to travel through the second optical member 4*b*. For this reason, there is basically no light beam emitted beyond the necessary area range, and hence it is possible to construct the illumination optical system which is excellent in efficiency. Moreover, the light beams guided by the total reflection surfaces and the reincidence surfaces, though the numbers of times of the refraction thereof are different from one another and the positions of the total reflection surfaces thereof are also different from one another, can be converted into the light beams having the nearly continuous distribution.

In addition, it is understood that when the angle of the total reflection surface is π/4 (rad), the components of light beams other than the components of light beams which are totally reflected on the light direction conversion surface 4g to be directed toward the emission surface 4f, i.e., the components of light beams which continue to travel through the second optical member 4b are constituted by only the components each having the relative small angle with respect to the light guide direction. As a result, the light which has been reflected on the total reflection surface disposed in the rear thereof or has been refracted by the refraction surface and reflected is considerably limited with its angle components, and hence has only the components each having an angle making a nearly right angle with the emission surface 4f. Thus, it is difficult to obtain the illumination optical system having the uniform illumination distribution for the whole area of the emission surface 4f. In addition, in the position near the light source having the uniform angle components in such a manner, the illumination is carried out with the wide-angle components.

As for a method of improving such a problem, there is known a method of setting the angle of the reincidence surface of each prism portion of the light direction conversion surface 4g as being smaller than $\pi/2$ (rad). According to this method, the angle of the light beam directed to the connection portion 4e can be allowed up to a larger angle, and many light beams can be emitted in the position distant from the light source. At the same time, the illumination covering the wide-angle range can be suppressed even in the area having the uniform angle components in the area near the light source.

FIGS. 10A to 10F show states of the light beams when the above-mentioned method is used. In an example shown in FIGS. 10A to 10F, the angle of the reincidence surface is set to $7\pi/18$ (rad). Note that the angle of the total reflection surface is $\pi/4$ (rad). In this case, it is understood that the angles of the light beams emitted by the total reflection is suppressed to a narrow angle range as compared with the case shown in FIGS. 9A to 9H, and light beams, which continue to travel without being emitted by the total reflection, travel with wider angle distribution. Also, it is understood that there are relatively many light beam components in the refracted light, and there are a few light beam components which are directed toward the emission surface 4f through the total reflection. In addition, in this case, it is understood that the light beam components each having the relatively large angle are converted into the light beam components to be emitted through the emission surface 4f by the total reflection on the total reflection surface.

Next, the cases where the angles of the total reflection surface are $2\pi/9$ (rad), $7\pi/36$ (rad), and $\pi/6$ (rad) (but, the angle of the reincidence surface is $\pi/2$ (rad)), respectively, will be described with reference to FIGS. 15A to 15F, FIGS. 20A to 20F, and FIGS. 25A to 25D.

When the angle of the total reflection surface is $2\pi/9$ (rad), as shown in FIGS. 15A to 15F, the characteristics related to the light beam components which are totally reflected by the total reflection surface to be emitted through the emission surface 4f, and the light beam components which travel within the second optical member 4b through the refraction and the reincidence are nearly the same as those in the case shown in FIGS. 9A to 9H where the angle of the total reflection surface is $\pi/4$ (rad). However, the angles of the light beams, which are totally reflected to reach the emission surface 4f, do not generally become perpendicular to the emission surface 4f, and slightly incline. In addition, the number of light beams which are guided to the emission surface 4f through the total reflection increases, while the number of light beams which are returned back to the second optical member 4b through the refraction decreases. In addition, the prism portions each adapted to serve as the total reflection surface are up to the third prism portion located in the rear of the prism portion concerned from the prism portion concerned, and hence the number of prism portions each adapted to serve as the total reflection surface, i.e., the number of total reflection surfaces which actually function decreases. Those points are different from the case shown in FIGS. 9A to 9H where the angle of the total reflection surface is $\pi/4$ (rad).

From the foregoing, when the angle of the total reflection surface of the light direction conversion surface 4g is set to $2\pi/9$ (rad), it is possible to obtain such effects that the light beams emitted through the emission surface 4f have a distribution, in which the light beams generally, slightly incline toward the light traveling direction; of the light beams which have reached the light direction conversion surface 4g, the number of light beams which are effectively emitted through the emission surface 4f shows a tendency to increase; and the number of times of the refraction until the light beams reach the total reflection surface decreases to whereby suppress an amount of light quantity loss due to the surface reflection accompanying the incidence and emission to a low level.

In addition, the characteristics in which with respect to the angle of light beam components emitted through the emission surface 4f, each of the light beams reflected on the total reflection surface near the endpoint of the prism portion, to which attention is paid this time, has the angle most perpendicular to the emission surface 4f, and the light beams reflected by the total reflection surface more distant from the endpoint of the prism portion show a tendency in which their angles with respect to the emission surface 4f further incline toward the traveling direction; the angle of the light beam components reflected on the total reflection surfaces, and the components returned back to the second optical member 4b through the refraction also have the nearly continuous angle distribution; and so forth are nearly the same as those in the case shown in FIGS. 9A to 9H where the angle of the total reflection surface is $\pi/4$ (rad).

The case shown in FIGS. 20A to 20F where the angle of the total reflection surface is $7\pi/36$ (rad), and the case shown in FIGS. 25A to 25D where the angle of the total reflection surface is $\pi/6$ (rad) show the same tendency. Thus, this tendency remarkably appears as the angle of the total reflection surface is decreased.

In such a manner, the angle of the total reflection surface of the light direction conversion surface 4g is made small, whereby it is possible to configure the illumination optical system in which the light beams made incident on the second optical member 4b is easy to be emitted through the emission surface 4f. On the other hand, when the light beams are emitted through the emission surface 4f, the light beams are emitted at angles which slightly incline with respect to the emission surface 4f, and hence show a tendency in which the management for the illumination light is difficult. However, since the second optical member 4b if formed in ring-like shape, the light beams are emitted through the whole emission surface 4f so as to complement each other with their directions, and hence a nearly uniform illumination can be carried out without exerting negative effect on the photographing.

In addition, since the optical member 4 according to this embodiment is configured so that most of the light beams are easy to be emitted through the emission surface 4f when the light beams reach the light direction conversion surface 4g, a thickness of the second optical member 4b exerts a large influence on the optical system. That is, when the second optical member 4b is too thin, almost the light components are emitted in the portion near the light source, and hence it becomes difficult to uniformly emit the light beams from the whole circumference of the emission surface 4f. For this reason, in order to obtain the uniform light beams in all the areas of the emission surface 4f, it is necessary to obtain a thickness of the second optical member 4b corresponding to the setting of the angle of the total reflection surface. Hence, the thickness of the second optical member 4b is set to a value corresponding to the setting of the angle of the total reflection surface.

Moreover, a quantity of light to be returned back to the second optical member 4b can be controlled by changing the angle of the reincidence surface of the prism portion in the light direction conversion surface 4g in correspondence to the position from the light source, and as a result, a quantity of light to be emitted through the emission surface 4f can also be controlled. That is, such angle setting is carried out that a quantity of emitted light is intentionally decreased in the position near the light source, and a quantity of emitted light is further increased in the position more distant from the light source, whereby the uniform light emission can be carried out in the whole circumference. At this time, since the distribution of the emission light beams is substantially regulated by the angle of the reflection surface, it is possible to obtain the ring-like illumination in which the angle distribution and a quantity of light are fixed.

Next, numeric values which determine the preferable shapes will be described. In this case, a description will hereinafter be given with respect to numeric values when the thickness of the second optical member 4b is fixed, and the angle of the reincidence surface with respect to the emission surface 4f is set to $\pi/2$ (rad).

The angle $\Phi$ (rad) of the total reflection surface with respect to the emission surface 4f of each prism portion in the light direction conversion surface 4g formed in the second optical member 4b is desirably set so as to satisfy the following inequality:

$$\pi/6 \leq \Phi \leq \pi/4 \quad (2)$$

The reason is as follows. In a case where the optical resin material used in the normal illumination optical system is used as described above, if the angle $\Phi$ exceeds a maximum value, $\pi/4$ (rad), the number of light beams which are totally reflected on the total reflection surfaces of the prism portions extremely decreases, the number of times of the refraction increases, and hence an amount of light quantity loss due to the surface reflection accompanying the incidence/emission of the light beams to/from the optical member extremely increases, and thus the desirable optical system cannot be obtained. In addition, if the angle $\Phi$ becomes equal to or smaller than a minimum value, $\pi/6$ (rad), the angles of the emission light beams with respect to the emission surface 4f become too large, and hence the desirable optical system cannot be obtained. Ideally, when the angle of the total reflection surface is set to about $2\pi/9$ (rad), it is possible to obtain the well-balanced optical characteristics in which the efficiency is most excellent, and the angles of the emission light beams with respect to the emission surface 4f do not become too large.

In addition, a pitch D (mm) of a plurality of prism portions formed in the light direction conversion surface 4g of the second optical member 4b is preferably set so as to satisfy the following inequality:

$$0.3 \leq D \leq 4.0 \quad (3)$$

This reason is that if the pitch D becomes equal to or smaller than a minimum value, 0.3 mm, an influence of a rounded surface in the vicinity of a vertex of the prism portion formed when the light direction conversion surface 4g is formed becomes large, and functions of the separation and the total reflection which the light direction conversion surface 4g has and which depend on the angles of the incident light beams cannot be caused to be effectively shown, and hence the desirable optical system cannot be not obtained. In addition, if a formation method is used with which the edge can be surely formed in the fine prism portion, the manufacturing cost of the second optical member 4b becomes extremely expensive. This is not practical.

In the light direction conversion surface 4g, as described above, the light emitting points concentrate on ridgeline portions corresponding to the pitch D. In other words, if the pitch D of the ridgeline portions is wide, the number of light emitting points decreases, and hence the light emission intensities of the respective light emitting points become high. From this viewpoint, the reason that the pitch D is set equal to or smaller than the maximum value, 4 mm, is that for an ideal illumination optical system for the macro photographing, a case where a quantity of light emission is less in each of the light emitting points and where the number of light emitting points is large is superior to other cases in terms of the characteristics. In addition, as another reason, since increasing in the width of the pitch means that the light direction conversion surface 4g is thickened, this is undesirable from a viewpoint of miniaturization as well. Here, when the above-mentioned function portion in the second optical member 4b is formed so as to be thickened, this is favorable in terms of obtaining uniform light distribution characteristics. However, making the light direction conversion surface 4g thicker than is needed increases the demerit due to scale-up of the members depending on degrees of an improvement in the optical characteristics.

A width w (mm) of a cross section of the second optical member 4b in a direction perpendicular to the light guide direction is desirably set so as to satisfy the following inequality:

$$1.0 \leq w \leq 10.0 \quad (4)$$

As the width w of the cross section is made smaller, this is more advantageous to miniaturization of not only the illumination apparatus, but also the apparatus. Actually, however, if the width w is made smaller than is needed, the light beams made incident from the light source cannot be confined within the second optical member 4b, and hence the light quantity loss in the optical system becomes very much. Here, a minimum value, 1.0 mm, of the width w is a minimum value effective for an optical system in which a light source itself has the condensing property, and hence light beams emitted from the light source do not very widely spread. On the other hand, a maximum value, 10.0 mm, of the width w is a value effective for a light source having a relatively wide illumination angle range. However, since a size of a compact camera is strictly regulated, constructing the second optical member 4b with the width w equal to or larger than that maximum value, 10 mm, makes it difficult to realize the compact camera as a product. From this reason, in this embodiment, the second optical member 4b is constructed so as to have the width w of 3 mm.

Note that, the above-mentioned numeric values are determined as numeric values to configure an optical system under the condition that the thickness of the second optical member 4b is fixed, and the angle of the reincidence surface with respect to the emission surface 4f is set to $\pi/2$ (rad). However, it is needless to say that the thickness of the second optical member 4b and the angle of the reincidence surface are suitably set, whereby a range of other numeric values can also be set without being limited to the range of the above-mentioned numeric values.

Second Embodiment

Figure 26:
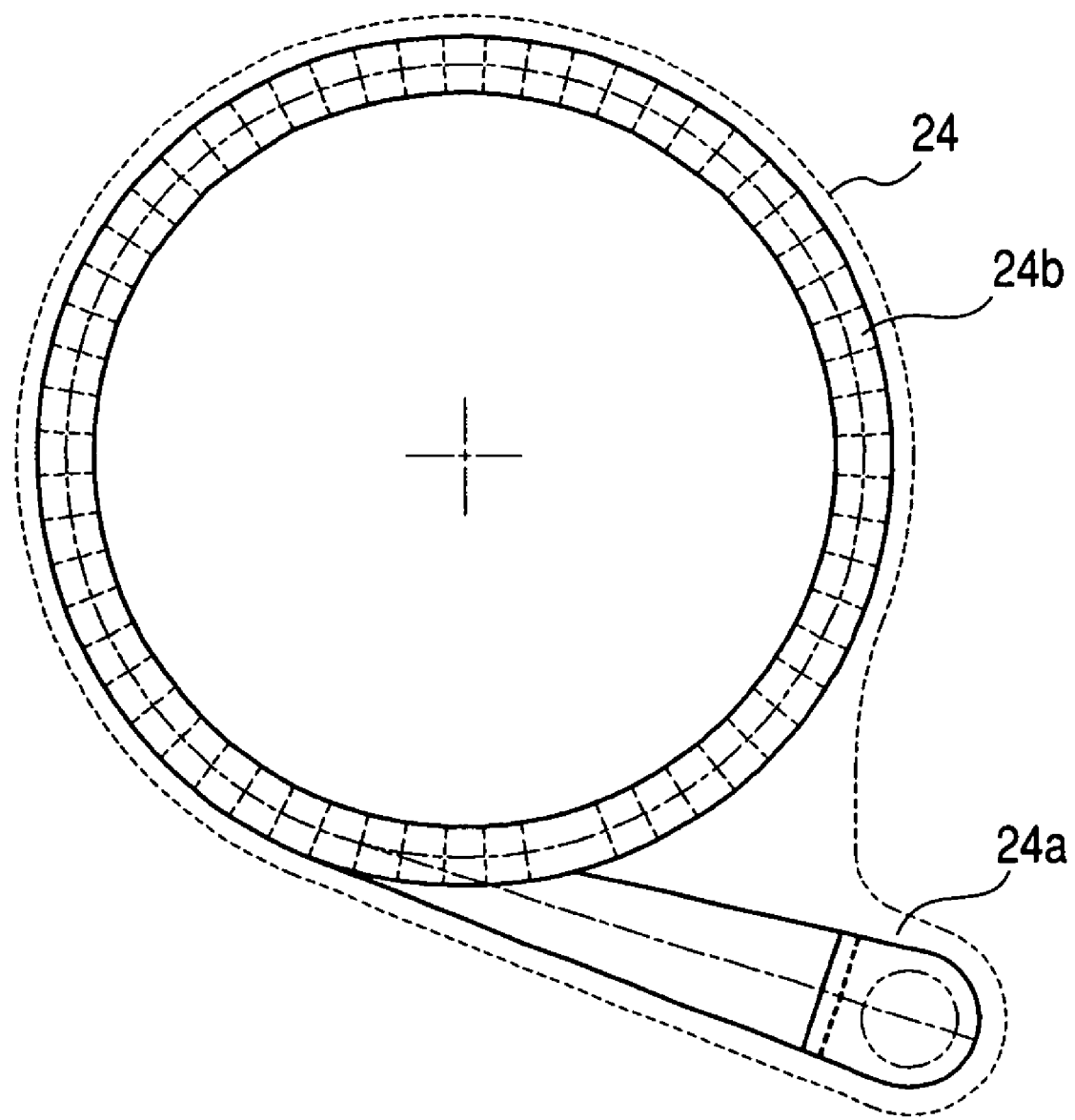
FIG. 26 is a vertical cross sectional view of a main portion constituting an optical system of a ring light for macro photographing according to a second embodiment of the present invention.
Figure 28A:
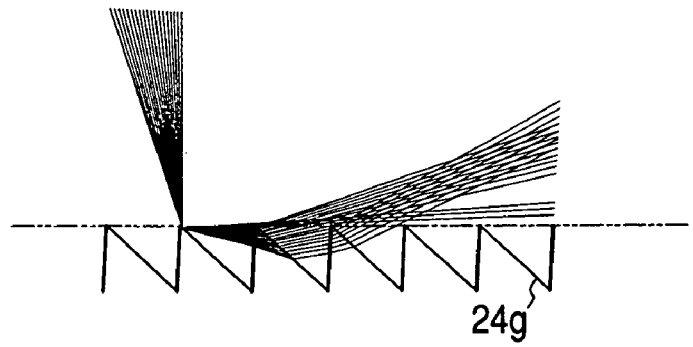
FIGS. 28A, 28B, 28C, and 28D are views each schematically showing a behavior of light beams in a reflecting surface at a point near a light source.
Figure 28B:
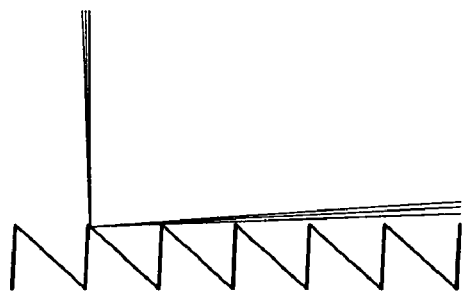
Figure 28D:
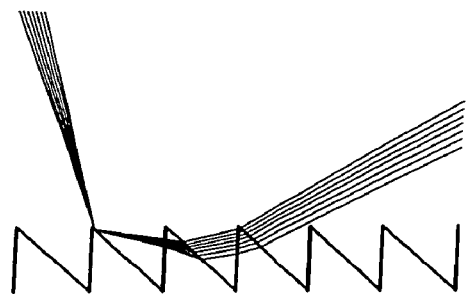
Figure 28C:
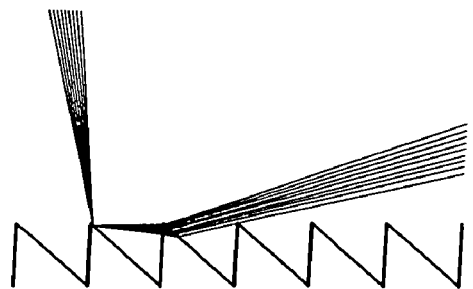
Figure 29A:
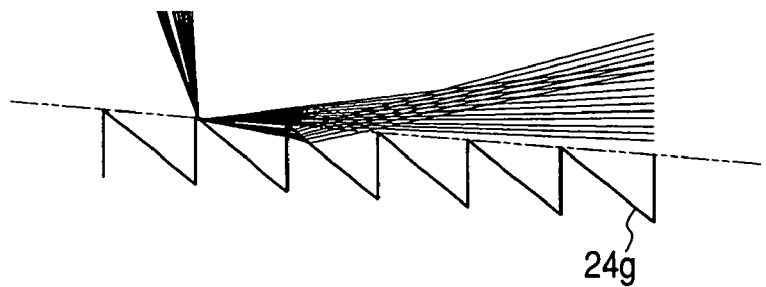
FIGS. 29A, 29B, and 29C are views each schematically showing a behavior of light beams in a reflecting surface at a point distant from a light source.
Figure 29B:
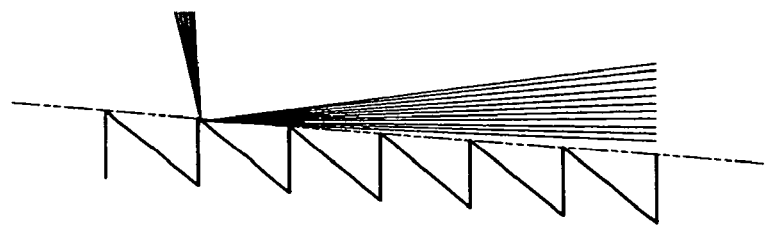
Figure 29C:
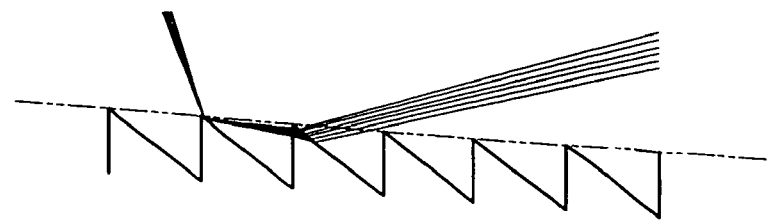

Next, a second embodiment of the present invention will be described with reference to FIG. 26, FIGS. 27A to 27E, FIGS. 28A to 28D, and FIGS. 29A to 29C. FIG. 26 is a vertical cross sectional view of a main portion constituting an optical system of a ring light for macro photographing according to the second embodiment of the present invention; FIGS. 27A to 27E are views each schematically showing a state in which a second optical member in the second embodiment of the present invention in which an angle of a total reflection surface of a light direction conversion surface is set to $2\pi/9$ (rad) is linearly developed; FIGS. 28A to 28D are views each schematically showing a behavior of light beams on a reflection surface in a point near a light source side; and FIGS. 29A to 29C are views each schematically showing a behavior of light beams on a reflection surface in a point distant from the light source.

The first embodiment involves a problem that there are a large number of emission light beams in the position near the light source, and the more distant from the light source, the further a quantity of emitted light decreases. Then, this embodiment is configured so that quantities of emitted light in individual positions of the emission surface become fixed, and a distribution of light beams emitted in the individual positions of the emission surface becomes nearly uniform over the whole circumference of the emission surface.

This embodiment is different from the first embodiment in that a thickness of the second optical member changes depends on positions. In addition, this embodiment is different from the first embodiment in that a pitch of total reflection surfaces of a light direction conversion surface changes, and also the pitch is wide.

As shown in FIG. 26, the ring light for macro photographing of this embodiment, similarly to the first embodiment, is provided with an optical member 24 for emitting light beams applied from an LED (shown in FIGS. 27A to 27E) from a ring-like light emitting portion. The optical member 24 is constituted by a first optical member 24a, and a second optical member 24b for forming the ring-like light emitting portion. The second optical member 24b, similarly to the first embodiment, is joined integrally with the first optical member 24a, and is disposed in a head portion of a lens barrel of a video camera.

Figure 27A:
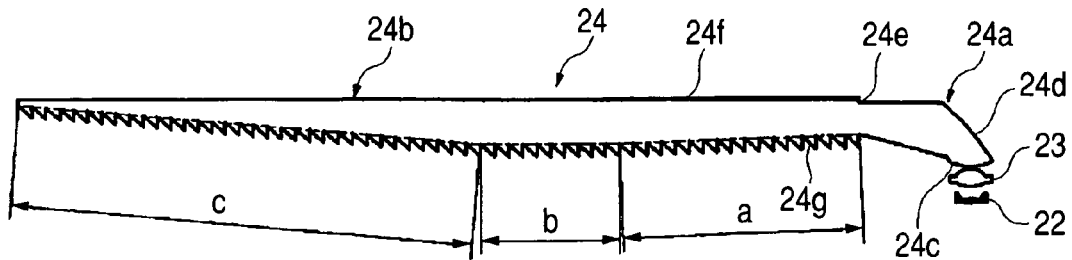
FIGS. 27A, 27B, 27C, 27D, and 27E are views each schematically showing a state in which a second optical member in which an angle of a total reflection surface of a light direction conversion surface is set to 2π/9 (rad) is linearly developed in the second embodiment of the present invention.
Figure 27B:
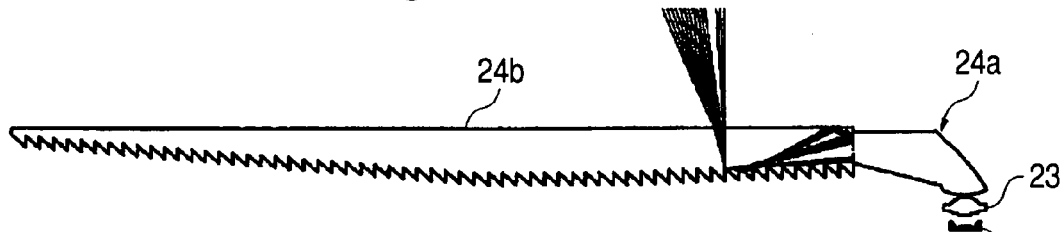
Figure 27C:
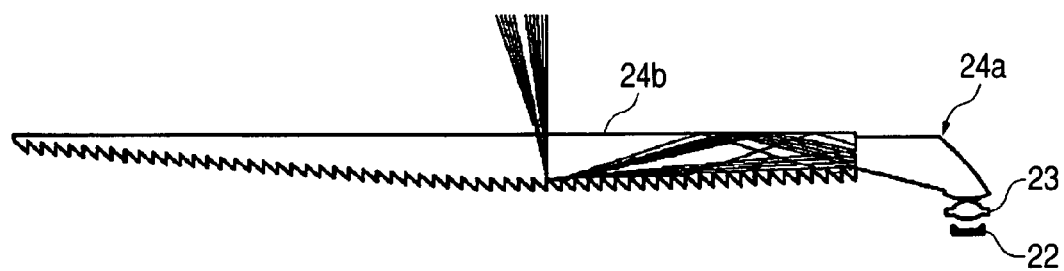
Figure 27D:
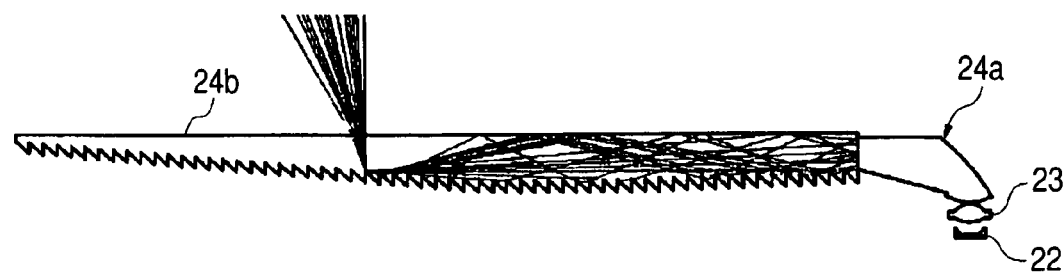
Figure 27E:
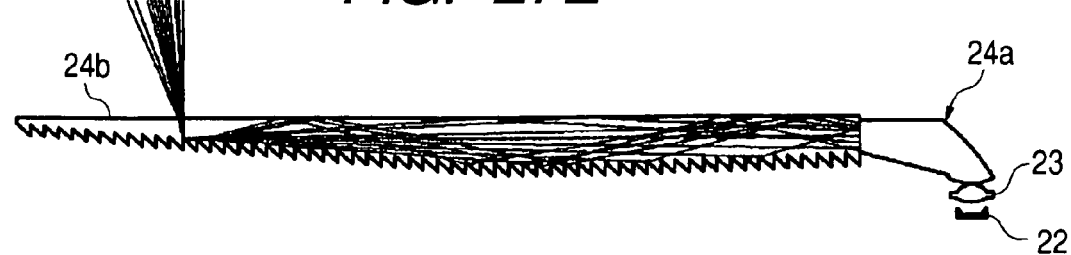

As shown in FIG. 27A, light beams applied from the LED 22 as a light source are condensed by a condenser lens 23 and made incident on the first optical member 24a of the optical member 24. The first optical member 24a includes a lens portion 24c having a positive refracting power in its incidence surface, and a total reflection surface 24d for converting directions of the light beams made incident thereon. In addition, the first optical member 24a and the second optical member 24b are joined integrally to each other through a connection portion 24e. The connection portion 24e has a wider connection area than that in the first embodiment. As will be described later, this is because the second optical member 24b of this embodiment is configured so as to emit all the light beams in one circuit. That is, since all the light beams are emitted by the end of one circuit, there is no need to take into consideration a back flow of the light beams in the connection portion 24e, and hence the first and second optical members 24a and 24b can be connected to each other through a wide area. In addition, the first and second optical members 24a and 24b are connected to each other through a wide area at the connection portion 24e, and the light beams having a uniform light distribution are incident on the connection portion 24e, whereby the uniform illumination can be carried out even in an area near the light source irrespective of the positions.

In this embodiment, while not being described clearly, the LED 22 is disposed in a position distant from the second optical member 24b as compared with the case of the first embodiment. Disposing the LED 22 in such a manner results in that such a stray light portion, that the light beams emitted from the LED 22 are directly made incident on the second optical member 24b and applied, can be previously prevented from occurring, and also there is no need to provide a diffusion portion for preventing occurrence of the stray light.

The second optical member 24b is constituted by a ring-like member. And an emission surface 24f, through which the light beams are to be emitted, is formed in one end face of the second optical member 24b. A light direction conversion surface 24g is formed in the other end face of the second optical member 24b. The light direction conversion surface 24g includes a surface which is constituted by continuously disposing a plurality of prism portions. An interval between the adjacent prism portions is set wider than that in the first embodiment.

The second optical member 24b can be divided into three areas a, b, and c formed along a circumferential direction thereof. Shapes of the three areas a, b, and c are optimized. The area a is configured so that an envelope connecting vertices of the prism portions of the light direction conversion surface 24g is inclined from the connection portion 24e toward the area b, whereby a thickness of the second optical member 24b in the area a gradually increases toward the area b. The area b is configured so that the thickness is fixed. Also, the area c is configured so that an envelope connecting root side vertices of the prism portions of the light direction conversion surface 24g is inclined from the area b, whereby a thickness of the second optical member 24b in the area c gradually decreases from a boundary between the areas b and c. Here, an angle of a total reflection surface (an angle of a total reflection surface with respect to the emission surface 24f) of each prism portion of the light direction conversion surface 24g adapted to determine directions of the light beams to be emitted through the emission surface 24f is set to a constant angle, i.e., $2\pi/9$ (rad).

Each of FIGS. 27B to 27E shows loci of the light beams able to be emitted from the vicinities of the head portions (root side vertices) of the total reflection surfaces of the prism portions located in typical positions with the position of the correction portion 24e as a reference on the assumption that the light beams having a uniform distribution are made incident on the connection portion 24e. As shown in FIGS. 27B to 27E, it is understood that while a part of the light beams having some angle components does not exist, the irradiation angle range is nearly fixed, and a nearly uniform angle distribution of the light beams applied can be obtained of the applied light beams. In such a manner, the angle of the total reflection surfaces are set to a fixed angle, and the thickness of the second optical member 24b is changed to optimize the shape, whereby the ring-like light emitting portion is configured which has a nearly uniform light distribution in each of the positions of the ring-like emission surface 24f. In addition, a end portion of the second optical member 24b (an end portion of the area c in a state in which the second optical member 24b is developed) is made thinnest, whereby almost all the light beams made incident on the connection portion 24e are emitted through the emission surface 24f, and hence the illumination optical system having an excellent efficiency can be configured. That is, almost all the incident light beams are emitted by the end of one circuit while the light beams made incident on the second optical member 24*b* are guided through the light direction conversion surface 24*g*.

Here, when guiding the light beams for the long distance by the total reflection, in spite of the less light quantity loss, there arises negative effect due to a transmittance of the resin material of which the second optical member 24*b* is made. Hence, it is desirable that the optical path length formed in the second optical member 24*b* be shortened as much as possible, and all light beams be emitted through this optical path length.

Next, a behavior of the light beams in the light direction conversion surface 24*g* will be described with reference to FIGS. 28A to 29C.

This embodiment is constituted so that nearly the same distribution and emission directions of the light beams as those in the case shown in FIGS. 13A to 13D (the angles of the total reflection surfaces are equal to one another) are maintained in a position near the light source and in a position distant from the light source. FIG. 28A shows all the light beams which can be emitted in a position (a position existing in the area a) near the light source side. In addition, FIG. 28B shows the light beams which are reflected and not refracted among the light beams shown in FIG. 28A, FIG. 28C shows the light beams which are refracted once and reflected, and FIG. 28D shows the light beams which are refracted twice and reflected. As described above, the area a is configured so that the envelope connecting the vertices of the prism portions of the light direction conversion surface 24*g* is inclined from the connection portion 24*e* toward the area b, whereby the thickness of the optical member in the area a gradually increases toward the area b.

Figure 13A:
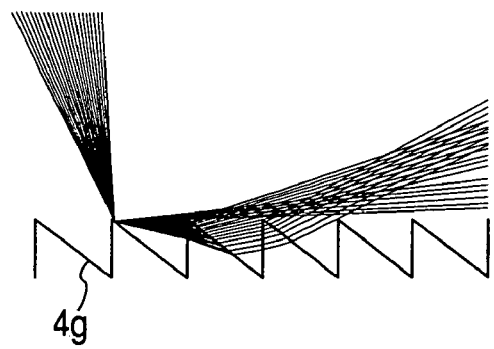
FIGS. 13A, 13B, 13C, and 13D are views each showing a state of light beams in a total reflection surface at a point (a point A in FIG. 12) near a light source side.
Figure 13B:
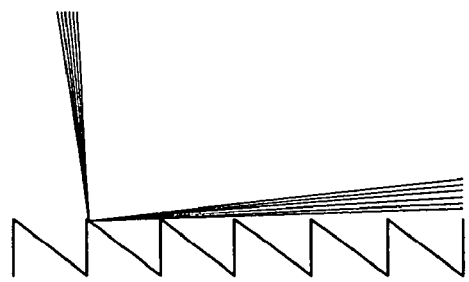
Figure 13D:
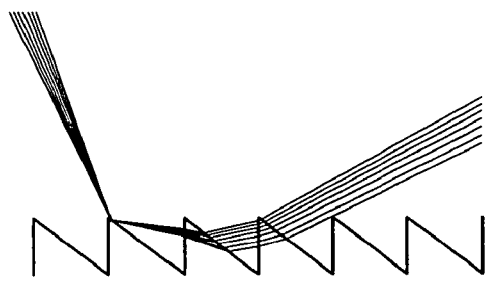
Figure 13C:
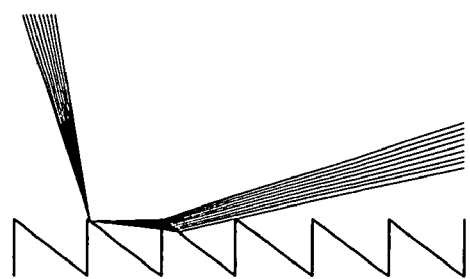
Figure 14A:
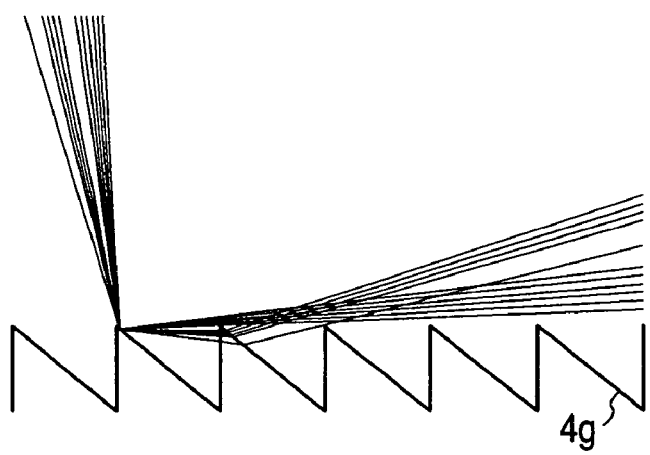
FIGS. 14A, 14B, and 14C are views each showing a state of light beams in a total reflection surface at a point (a point B in FIG. 12) distant from the light source.
Figure 14B:
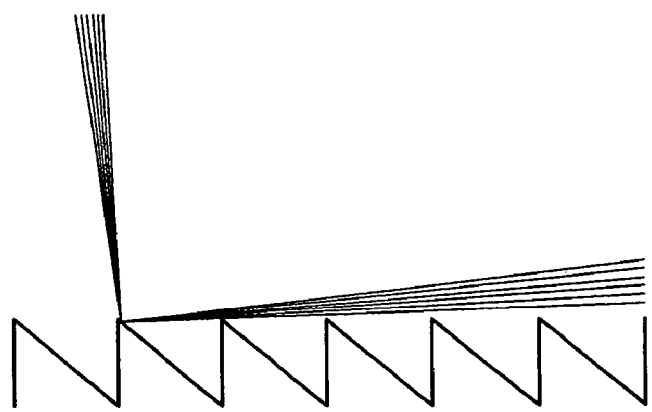
Figure 14C:
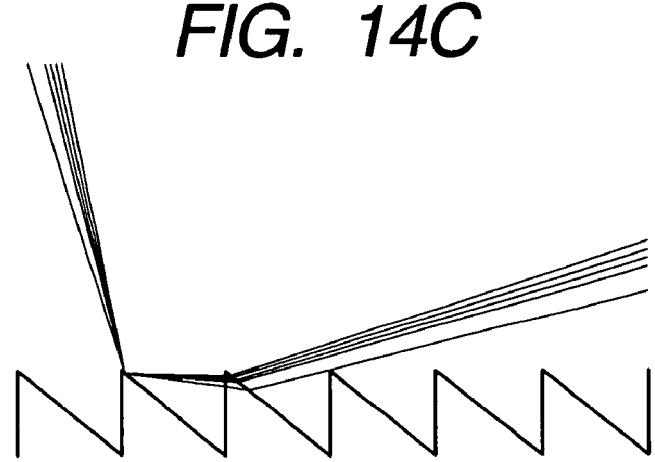
Figure 15A:
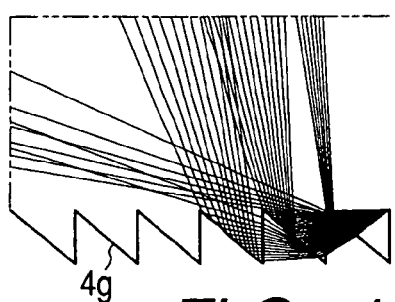
FIGS. 15A, 15B, 15C, 15D, 15E, and 15F are views each schematically showing a state of reflection and refraction of reutilized light beams in a position near the light source when an angle of a total reflection surface is 2π/9 (rad)
Figure 15B:
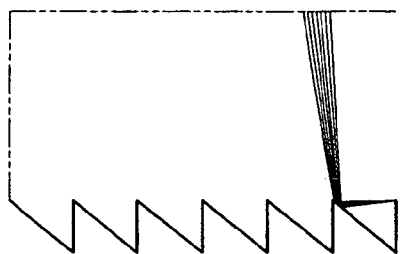
Figure 15F:
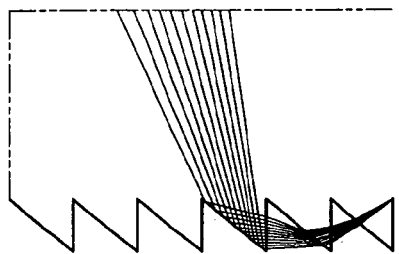
Figure 15C:
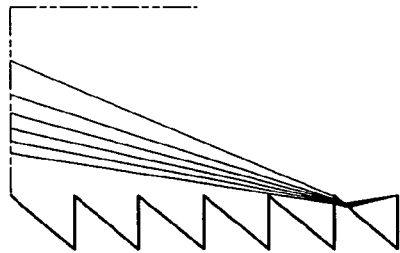
Figure 15D:
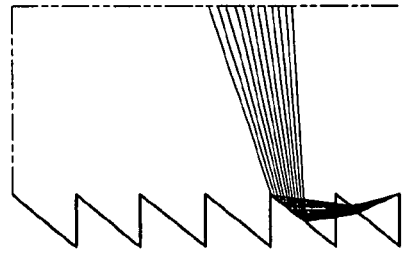
Figure 15E:
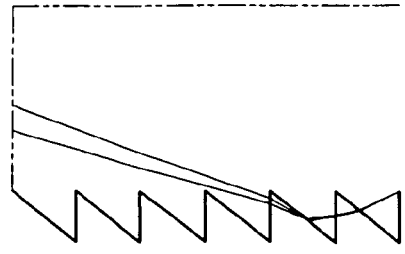

Here, it is understood from FIG. 28A that the broadening and the directions of the light beams directed to the emission surface 24*f* are nearly the same as those shown in FIG. 13A. However, with respect to the light beam components which are directly reflected and not refracted in the prism portions (comparison of FIG. 28B with FIG. 13B), this embodiment (FIG. 28B) is different from the first embodiment shown in FIG. 13B in that there are few light beams directed to the emission surface 24*f*. In such a manner, the position (the area a) near the light source is constructed so that the envelope of the prism portions of the light direction conversion surface 24*g* is gradually inclined with respect to the emission surface 24*f*, whereby the thickness of the optical member in the area a is gradually increased. As a result, the number of light beam components, which are directly reflected on the total reflection surface, can be reduced, and a quantity of emitted light in this portion can be qualitatively suppressed. Moreover, in the area a, a quantity of emitted light can be suppressed while the angle distribution and directions of the emission light beams are maintained nearly constant.

FIG. 29A shows all the light beams which can be emitted in a position (a position existing in the area c) distant from the light source. In addition, FIG. 29B shows the light beams which are reflected and not refracted among the light beams shown in FIG. 29A, and FIG. 29C shows the light beams which are reflected once and reflected. The area c, as described above, is configured so that the envelope connecting the vertices of the prism portions of the light direction conversion surface 24*g* is inclined from the boundary between the areas b and c toward the end portion of the area c, whereby the thickness of the optical member in the area c gradually decreases from the boundary between the areas b and c toward the end portion of the area c.

Here, it is understood from FIG. 29A that the broadening and directions of the light beams directed to the emission surface 24*f* are nearly the same as those shown in FIG. 13A. However, with respect to the light beam components which are directly reflected and not refracted in the prism portion (comparison of FIG. 29B with FIG. 13B), this embodiment (FIG. 29B) is different from the first embodiment shown in FIG. 13B in that there are many light beams directed toward the emission surface 24*f* in the case of this embodiment (FIG. 29B). In such a manner, the position (the area c) distant from the light source is constructed so that the envelope connecting the vertices of the prism portions of the light direction conversion surface 24*g* is gradually inclined with respect to the emission surface 24*f*, whereby the thickness of the optical member in the area c gradually decreases. As a result, the number of light beam components, which are directly reflected on the total reflection surface, can be increased, and a quantity of emitted light in this portion can be qualitatively increased. Moreover, in the area c, a quantity of emitted light can be increased while the angle distribution and directions of the emission light beams are maintained nearly constant.

In addition, it should be noted in the area c that there is no light beam component as shown in FIGS. 28D and 13D which is totally reflected after being refracted once, and the component, which is directly reflected on the total reflection surface and not refracted, sufficiently compensates for such component that is not generated. In addition, this embodiment may safely be said as a desirable mode in terms of the efficiency as well since the light distribution can be controlled while the number of times of refraction (emission and reincidence) of the light beams traveling within the second optical member 24*b* is reduced.

In such a manner, the inclination of the envelope connecting the root side vertices of the total reflection surfaces of the light direction conversion surface 24*g* of the second optical member 24*b* is changed corresponding to the areas a, b and c of the second optical member 24*b*, whereby the illumination can be carried out with a high efficiency while the distribution and directions of the emission light beams are maintained constant.

In addition, an interval between the adjacent prism portions of the light direction conversion surface 24*g* is set wider than that in the first embodiment. Hence, the shape of the light direction conversion surface 24*g* can be simplified, and the second optical member 24*b* can be inexpensively manufactured. In addition, as shown in FIG. 26, the interval between the adjacent prism portions of the light direction conversion surface 24*g* is widened, whereby the number of ridgeline portions (portions indicated by a broken line in FIG. 26) of the portions actually emitting the light, i.e., the number of light emitting points of the light direction conversion surface 24*g* is decreased. However, even in this case, sufficient light emitting points are ensured, and hence no unnatural nonuniformity in light distribution is generated. In addition, though the number of light emitting points is decreased, since a quantity of emitted light in each light emitting point increases, conversely, the whole emission intensity can be increased with a less light quantity loss.

Further, as described in the first embodiment, the portions in the vicinities of the bottom portions of the prism portions of the light direction conversion surface 24*g* form the light emitting points, respectively. Then, when the second optical member 24*b* is made of a resin material, it is difficult to form the shape of the portion in the vicinity of the bottom portion of each prism portion, i.e., the edge shape with the optical material, and hence this shape is likely to become rounded shape. The rounded shape causes occurrence of a large light quantity loss. In particular, when the interval is narrowed, this influence becomes large. The influence of the rounded shape in the portion in the vicinity of the bottom portion of each prism portion of the light direction conversion surface 24g can be suppressed to a minimum by widening the interval against such a problem.

Third Embodiment

Figure 30A:
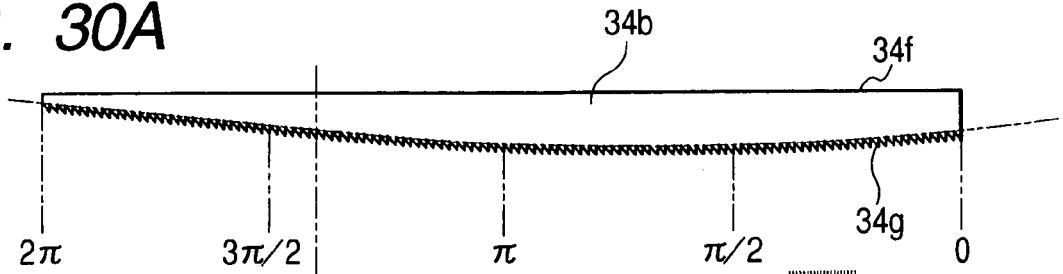
FIG. 30A is a view showing a state in which a second optical member of a ring light for macro photographing according to a third embodiment of the present invention is linearly developed.
Figure 30B:
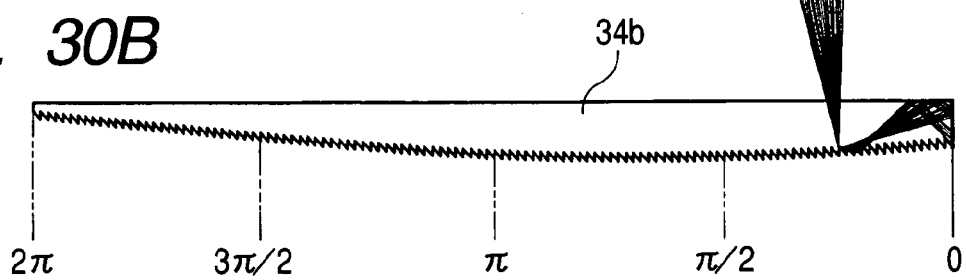
FIGS. 30B, 30C, 30D, and 30E are views each showing a state in which light beams made incident on the second optical member 34*b* are converted in their directions in individual positions of a light direction conversion surface 34*g* to be emitted through an emission surface 34*f*.
Figure 30C:
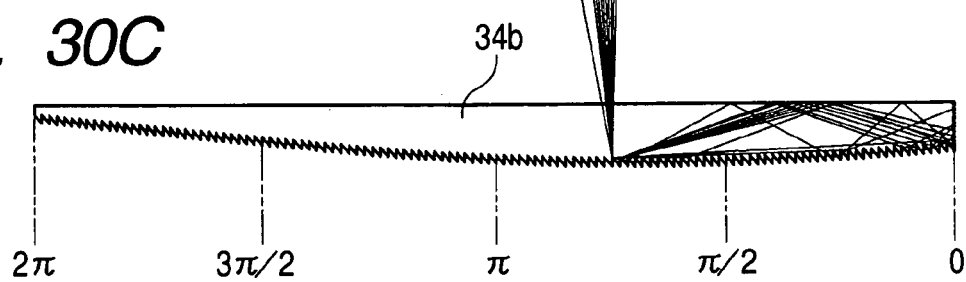
Figure 30D:
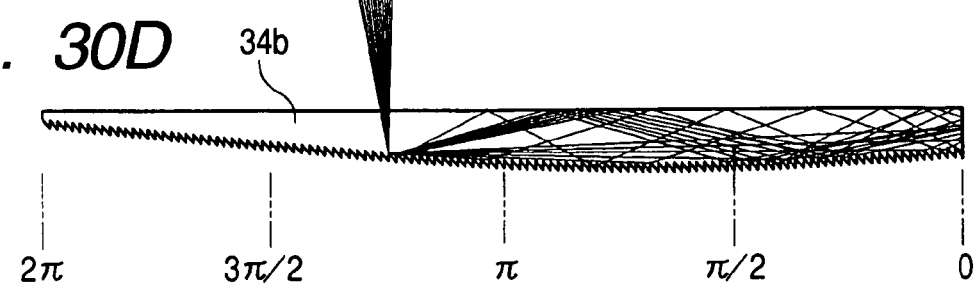
Figure 30E:
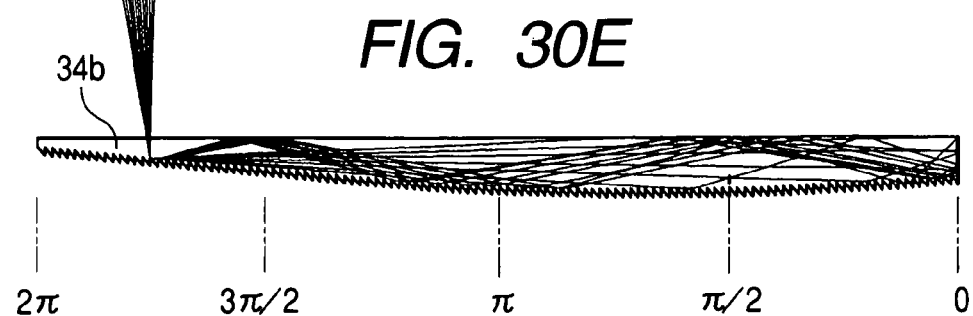

Next, a third embodiment of the present invention will be described with reference to FIGS. 30A to 30E. FIG. 30A is a view showing a second optical member 34b of a ring light for macro photographing according to the third embodiment of the present invention linearly developed; and FIGS. 30B to 30E are views showing states in which the light beams made incident on the second optical member 34b are emitted in positions of a light direction conversion surface 34g through an emission surface 34f, respectively.

The second optical member 34b of this embodiment, as shown in FIG. 30A, is configured so that its thickness continuously changes along a circumferential direction. The configuration allowing the thickness of the second optical member 34b to continuously change is obtained by forming the light direction conversion surface 34g so that an envelope connecting vertices of prism portions becomes a continuous curve with respect to an emission surface 34f of the light direction conversion surface 34g.

To be specific, the light direction conversion surface 34g is formed so that the envelope connecting the vertices of the prism portions becomes the continuous curve having a vertex in the vicinity of a position corresponding to $2\pi/3$ (rad), whereby the second optical member 34b is configured so that a thickness thereof continuously changes along a circumferential direction.

With such a configuration, it is possible to constitute an optical system in which as shown in FIGS. 30B to 30E, the nearly uniform emission light beams are obtained in the individual positions of the emission surface 34f.

Fourth Embodiment

Figure 31:
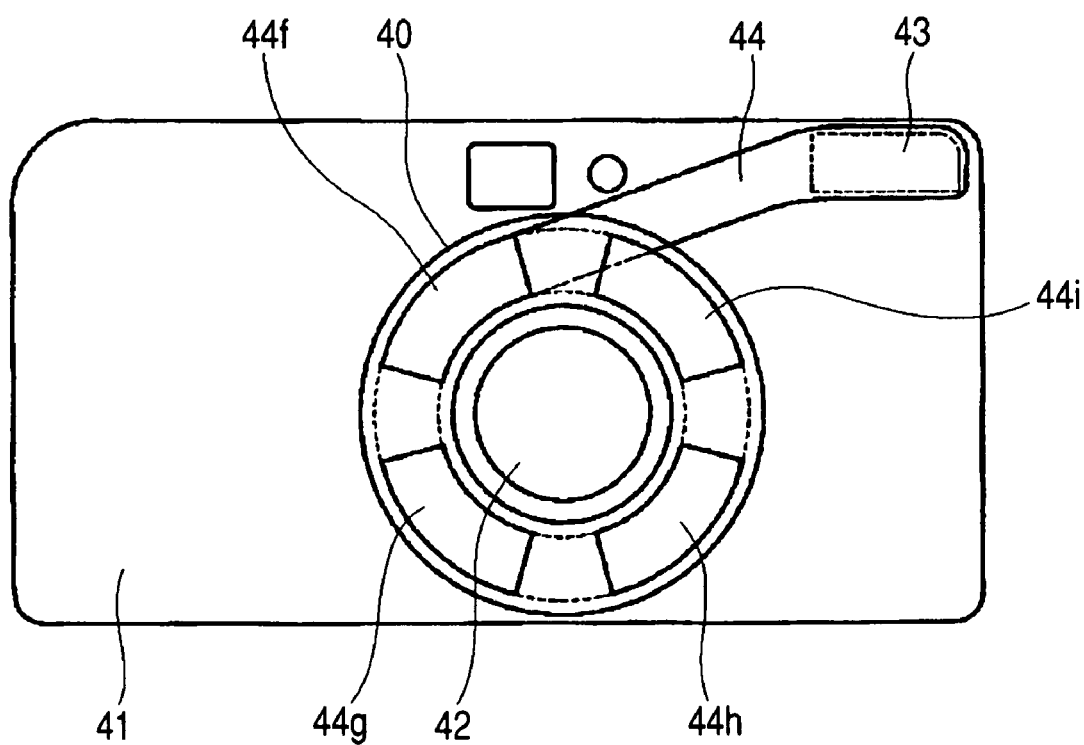
Figure 32:
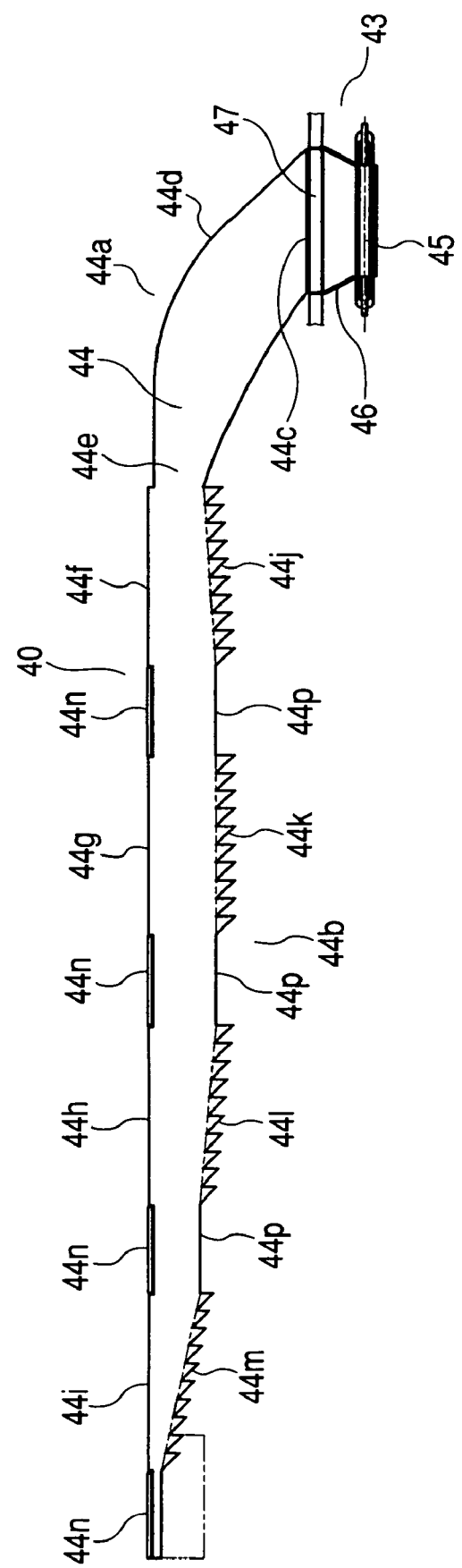
FIG. 32 is a view showing a state in which a main optical system of the stroboscope for macro photographing shown in FIG. 31 is plane-developed.
Figure 33:
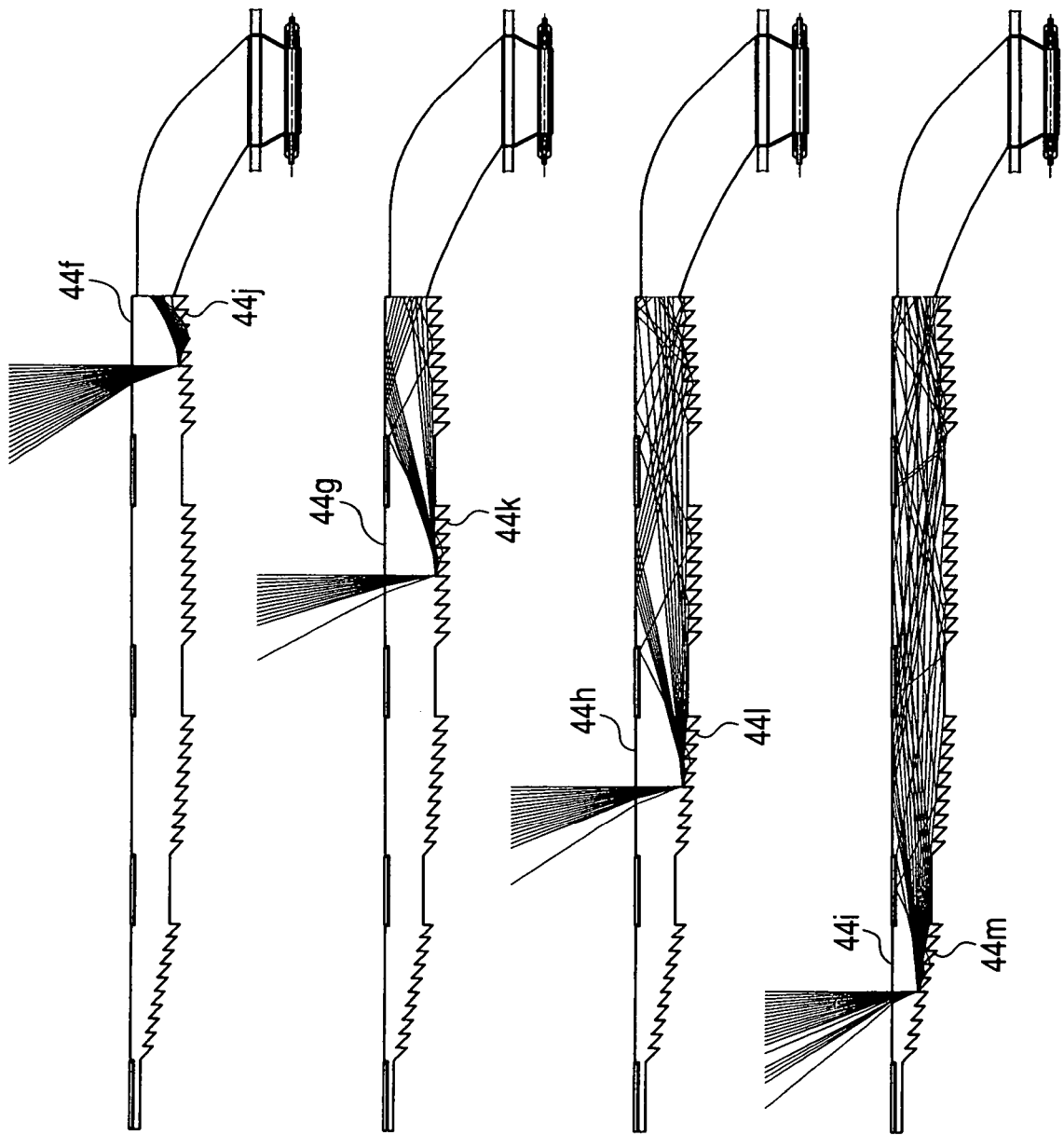
FIGS. 33A, 33B, 33C, and 33D are views each showing a state in which light beams made incident on a second optical member 44*b* are emitted through emission surfaces 44*f*, 44*g*, 44*h*, and 44*i*, respectively.

Next, a fourth embodiment of the present invention will be described with reference to FIGS. 31 and 32, and FIGS. 33A to 33D. FIG. 31 is a front view of a digital camera in which a stroboscope for macro photographing according to the fourth embodiment of the present invention is installed; FIG. 32 is a view showing a state in which a main optical system of the stroboscope for macro photographing is plane-developed; and FIGS. 33A to 33D are views showing states in which the light beams made incident on a second optical member 44b are emitted through emission surfaces 44f, 44g, 44h and 44i, respectively.

As shown in FIG. 31, a stroboscope 40 for macro photographing functioning as an illumination apparatus, which is effective when a photographing mode is set to a macro mode (mode for proximity photographing), can be installed in a digital camera main body 41. That is, the stroboscope 40 for macro photographing is a apparatus for converting light applied from a stroboscopic light emission portion 43 which has, as a light source, a xenon (hereinafter referred to as "Xe") discharge tube able to apply uniform light beams to a photographing range of a photographing lens into illumination light for macro photographing. The stroboscope 40 for macro photographing includes a light-transmissive optical member 44. The optical member 44 is disposed in a head portion of a lens barrel 42, and has four emission surfaces 44f, 44g, 44h and 44i through which the light beams from the stroboscopic light emission portion 43 are to be emitted.

Next, constituent elements for regulating the optical characteristics of the stroboscope 40 for macro photographing will be described in detail with reference to FIG. 32.

The stroboscopic light emission portion 43, as shown in FIG. 32, includes a Xe discharge tube 45, a reflector 46 for reflecting light beams which are mainly directed backward and sideward of the light beams emitted from the Xe discharge tube 45 to apply the reflected light beams in a photographing direction, and a front window 47, constituted by a Fresnel lens, for condensing the light beams emitted from the Xe discharge tube 45. In a normal photographing, the stroboscopic light emission portion 43 is singly used, and applies uniform light beams to a photographing range of the photographing lens.

The optical member 44 is a member which has an incidence surface facing the front window 47, and which serves to guide the light beams made incident on the incidence surface to the circumference of the photographing lens barrel 42 to convert the guided light beams into a ring-like light beam. The incidence surface of the optical member 44 is positioned so as to face the front window 47, and thus the optical member 44 is installed and fixed to the digital camera main body 41 by using an installation member (not shown). The optical member 44 is made of an optical resin material having a high transmittance such as an acrylic resin.

The optical member 44 includes a first optical member 44a for converting directions of the light beams condensed by the reflector 46 and the front window 47 of the stroboscope, and a second optical member 44b connected to the first optical member 44a for converting the emission light beams into a ring-like light beam directed toward an optical axis direction of the photographing lens.

Next, a function of the optical member 44 and a shape for realizing the function will be described.

The first optical member 44a serves to convert directions of the light beams applied from the stroboscopic light emission portion 43, and to condense the light beams to a certain range. An incidence surface 44c of the first optical member 44a is larger than an opening portion of the front window 47, and is disposed near the front window 47. This configuration is effective to reduce the light beams as many as possible which are emitted to the outside through a gap between the front window 47 and the first optical member 44a to become a light quantity loss. With this configuration, a quantity of light emitted from the stroboscopic light emission portion 43 can be maximized to be effectively utilized.

The first optical member 44a converts a direction of the light beams incident thereon by $\pi/2$ (rad). In this embodiment, a reflecting surface 44d constituted by a continuous aspheric surface is formed in the first optical member 44a. The direction of the incident light beams is efficiently converted by the reflecting surface 44d. The reflecting surface 44d is formed by a metal-vapor deposited surface having a high reflectivity, because the light beams from the stroboscopic light emission portion 43 have a very wide-angle range so that the sufficient direction conversion cannot be realized merely by utilizing the total reflection.

The light beams directions of which have been converted by the reflecting surface 44a are guided to the second optical member 44b through the connection portion 44e between the first and second optical members 44a and 44b. In this connection, similarly to the second embodiment, the connection portion 44e is configured so as to have a shape allowing all the light beams to be emitted in by the end of one circuit within the second optical member 44b. Normally, the light beams are likely to exit in the vicinity of the connection portion to the outside. Also, when the light emission portion is formed in the vicinity of the connection portion, the light emission intensity in this portion decreases, and hence a position with weak emission intensity is likely to appear partially.

On the other hand, in this embodiment, since the connection portion 44e is disposed between the first and second optical members 44a and 44b, it is possible to previously prevent the discontinuous light emitting portion from being generated.

The second optical member 44b is configured so that the light beams made incident from the first optical member 44a are emitted in the form of the light beams each having a uniform light distribution and a uniform intensity distribution through emission surfaces 44f, 44g, 44h and 44i, respectively. Here, the emission surfaces 44f, 44g, 44h and 44i through which the light beams are to be emitted, respectively, are surfaces which are formed in one end face of the second optical member 44b at intervals along a circumferential direction of the second optical member 44b. Areas between the emission surfaces 44f, 44g, 44h and 44i are formed as non-emission surfaces 44n through each of which no light beam is to be emitted.

Four light direction conversion surfaces 44j, 44k, 44l and 44m are formed in the other end face of the second optical member 44b. The light direction conversion surfaces 44j, 44k, 44l and 44m are disposed at intervals so as to face the corresponding emission surfaces 44f, 44g, 44h and 44i, respectively. A plurality of prism portions are continuously formed in the light direction conversion surfaces 44j, 44k, 44l and 44m. Each of the prism portions has a total reflection surface. An angle of the total reflection surface, similarly to the second embodiment, is set to 2π/9 (rad).

Areas between the light direction conversion surfaces 44j, 44k, 44l and 44m are formed as surfaces 44p facing the corresponding non-emission surfaces 44n in the other surface of the second optical member 44b, respectively. The surfaces 44p are surfaces parallel to the corresponding non-emission surfaces 44n, in each of which no total reflection surface is formed which has an angle and constitutes the light direction conversion surface adapted to carry out selection depending on the angles of the light beams. Each of the surfaces 44p is a surface for preventing the light beams from exiting from the second optical member 44b to the outside. Thus, the portions corresponding to the respective surfaces 44p of the second optical member 44b serve so as to guide the light beams along the circumferential direction.

In the second optical member 44b, the property is changed every emission surface in order to adjust the properties so that the light emission intensities in the emission surfaces 44f, 44g, 44h and 44i become nearly constant. To be specific, the portion corresponding to the light direction conversion surface 44j of the second optical member 44b nearest the light source side is configured so that an envelope connecting vertices of the prism portions of the light direction conversion surface 44j is inclined with respect to the emission surface 44f, whereby a thickness of the second optical member 44b in the portion gradually increases. In addition, the portion corresponding to the light direction conversion surface 44k next to the light conversion surface 44j is configured so that an envelope connecting vertices of the prism portions of the light direction conversion surface 44k is made parallel to the emission surface 44g, whereby a thickness of the second optical member 44b in the portion becomes constant. Moreover, a portion corresponding to the next light direction conversion surface 44l is configured so that an envelope connecting vertices of the prism portions of the light direction conversion surface 44l is inclined with respect to the emission surface 44h, whereby a thickness of the second optical member 44b in the portion gradually decreases. Moreover, the portion corresponding to the light direction conversion surface 44m most distant from the light source is configured so that an envelope connecting vertices of the prism portions of the light direction conversion surface 44m is inclined with respect to the emission surface 44i, whereby a thickness of the second optical member 44b in the portion abruptly decreases. An operation of the shapes of the portions of the second optical member 44b is the same as that described in the above-mentioned second embodiment.

The emission of the light beams emitted through the emission surfaces 44f, 44g, 44h and 44i in the second optical member 44b configured in the above-mentioned manner are as shown in FIGS. 33A to 33D. It is understood from FIGS. 33A to 33D that the light beams each having a nearly uniform angle distribution are emitted through the emission surfaces 44f, 44g, 44h and 44i, respectively.

Note that while in this embodiment, the four emission surfaces are formed in the second optical member 44b, the present invention is not intended to be limited in number to the four emission surfaces, and hence for example, two emission surfaces covering a wide angle range may also be provided. Also, three or five or more emission surfaces may be formed.

Fifth Embodiment

Figure 34:
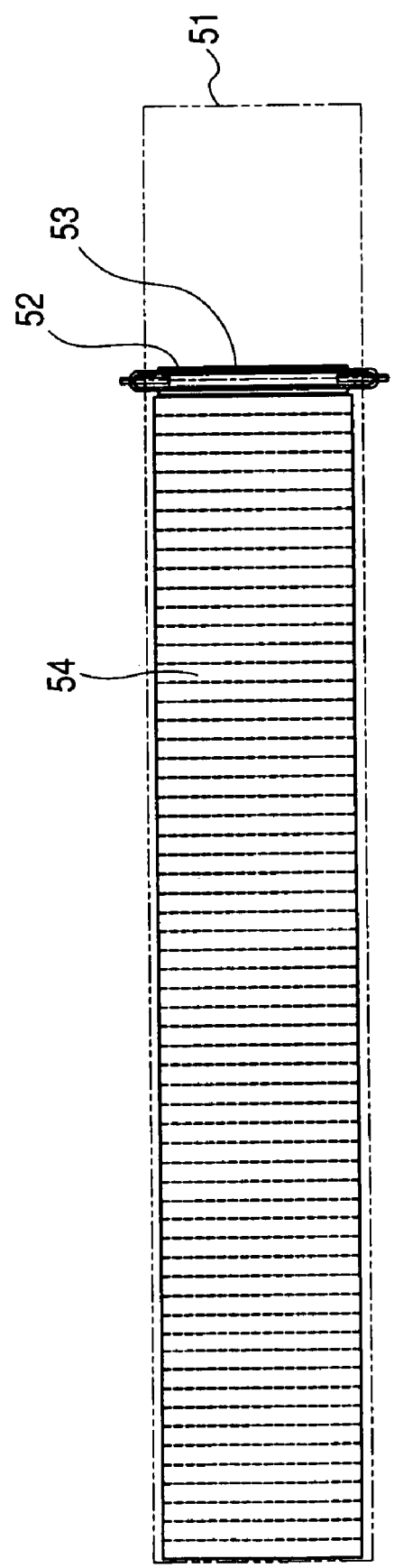
FIG. 34 is a plan view showing a main portion of an optical system of a stroboscopic apparatus as an illumination apparatus according to a fifth embodiment mode of the present invention.

Next, a fifth embodiment of the present invention will be described with reference to FIG. 34, and FIGS. 35A to 35D. FIG. 34 is a plan view showing a main portion of an optical system of a stroboscopic apparatus as an illumination apparatus according to the fifth embodiment of the present invention, and FIGS. 35A to 35D are vertical cross sectional views each schematically showing a state of emission light beams in an optical member 54 of the stroboscopic apparatus shown in FIG. 34.

The stroboscopic apparatus according to this embodiment, as shown in FIG. 34, includes a stroboscopic main body 51, a Xe discharge tube 52 for emitting a flash, a reflector 53 for reflecting the light beams emitted from the Xe discharge tube 52 in an emission direction, and an optical member 54 for converting irradiation directions to emit the light beams from a wide area. The optical member 54 is formed of a plate member having a slender rectangular shape and a fixed thickness. Thus, this embodiment provides the stroboscopic apparatus in which the Xe discharge tube 52, the reflector 53, and the optical member 54 are integrally built in. In addition, a light emission circuit (not shown) for causing the Xe discharge tube to emit a flash, and a power supply (not shown) are integrally built in the stroboscopic apparatus.

Figure 35A:
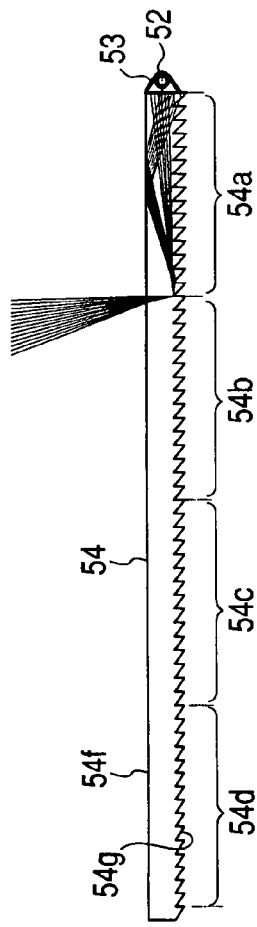
FIGS. 35A, 35B, 35C, and 35D are vertical cross sectional views each schematically showing a state in which light beams made incident on an optical member 54 of the stroboscopic apparatus shown in FIG. 34 are emitted, respectively.
Figure 35B:
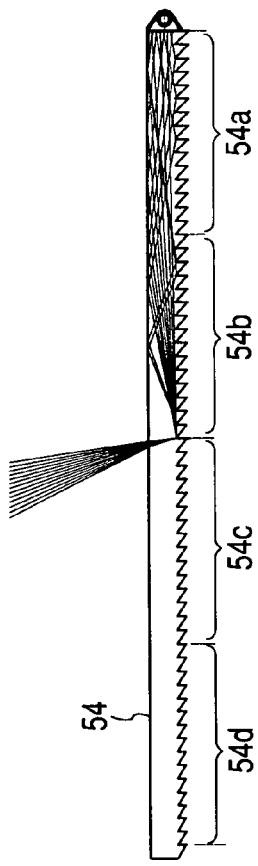
Figure 35C:
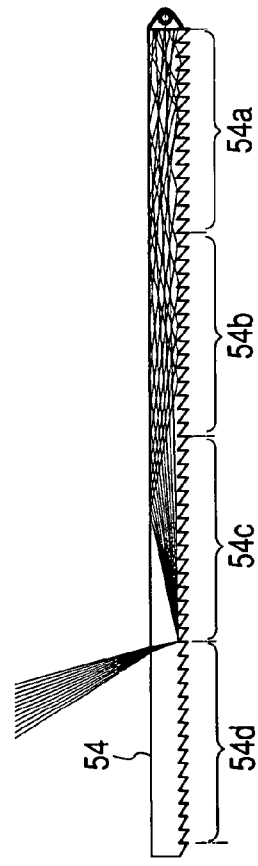
Figure 35D:
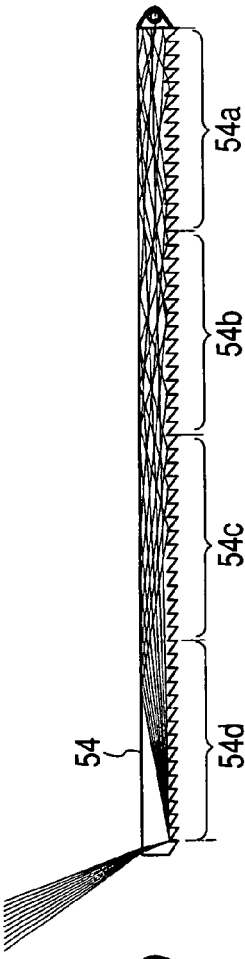
Figure 37A:
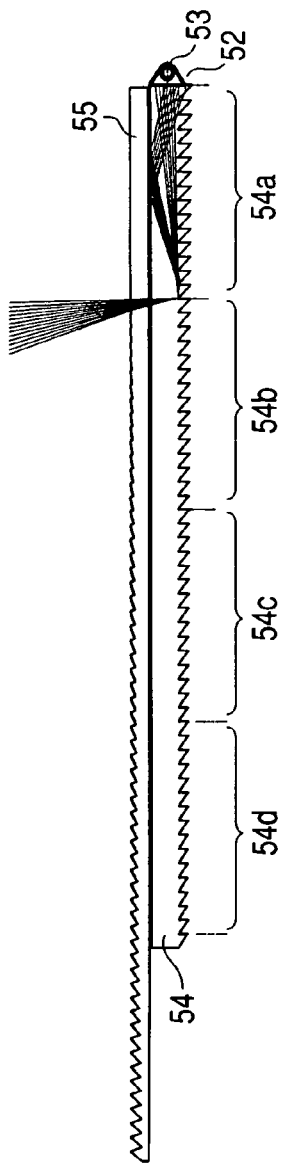
FIGS. 37A, 37B, 37C, and 37D are views each schematically showing a state in which an irradiation direction conversion member 55 shown in each of FIGS. 36A, 36*b*, 36C and 36D is moved in a longitudinal direction of the optical member 54.
Figure 37B:
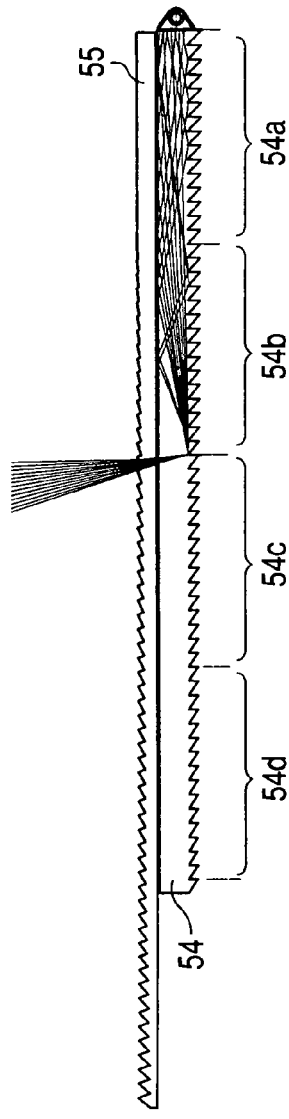
Figure 37C:
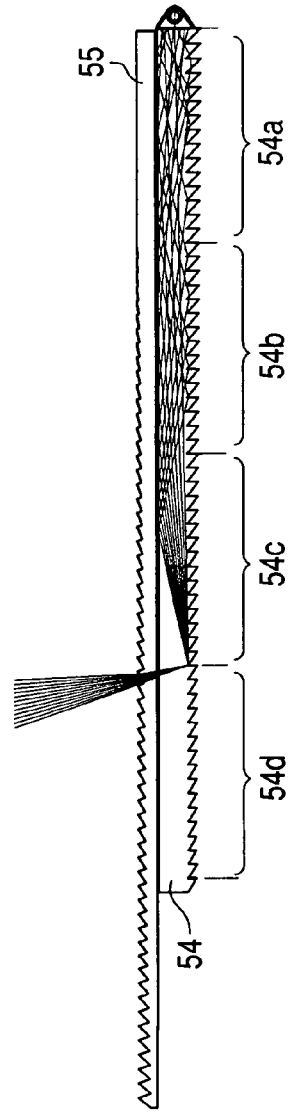
Figure 37D:
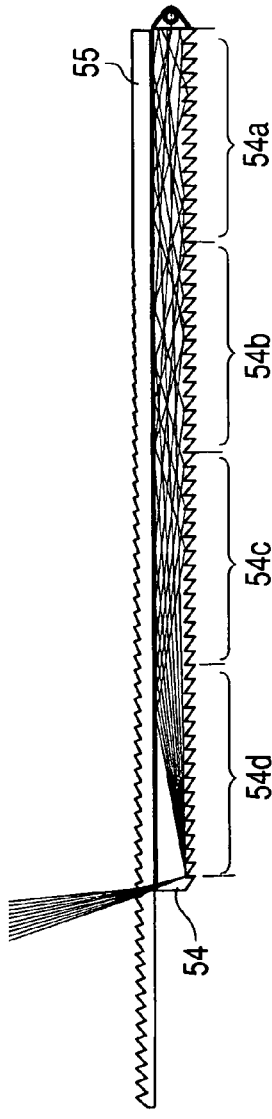

This embodiment adopts a configuration in which the light beams are directly made incident from a side of the optical member 54. As a result, there is no need to provide the reflection surface corresponding to the first optical member for converting the irradiation direction in each of the above-mentioned first to fourth embodiments in the optical member 54, and hence the configuration of the optical member 54 can be further simplified. As shown in FIG. 35A, the Xe discharge tube 52 is disposed in a position facing a side face of the optical member 54 in parallel to the side face thereof. The reflector 53 is disposed to face the side of the optical member 54 so as to efficiently guide the light beams emitted from the Xe discharge tube 52 to the optical member 54.

As shown in FIG. 35A, one surface of the optical member 54 is formed as an emission surface 54f. A light direction conversion surface 54g is formed in the other surface of the optical member 54. The light direction conversion surface 54g is configured by a surface, which is constituted by continuously forming a plurality of prism portions. Each of the prism portions has a total reflection surface. The light direction conversion surface 54g is divided into four areas 54a, 54b, 54c and 54d, and the angle of the total reflection surfaces of the prism portion in each of the four areas 54a, 54b, 54c and 54d are different from one another. Such angle settings result in that quantities of applied light in the positions along a longitudinal direction of the emission surfaces 54f become constant.

As shown in FIG. 35A, the angle (an angle with respect to the emission surface 54f) of the total reflection surface of the prism portion is set to $\pi/4$ (rad) in the area a of the light direction conversion surface 54g. The angle of the total reflection surface in the area b is set to $2\pi/9$ (rad), the angle of the total reflection surface in the area c is set to $7\pi/36$ (rad), and the angle of the total reflection surface in the area d is set to $\pi/6$ (rad).

As described in the first embodiment, as the angle of the total reflection surface is smaller, the number of emission light beams in the light direction conversion surface 54g can be increased. Consequently, as shown in FIGS. 35A to 35D, by configuring the angle of the total reflection surface being smaller as more distant from the light source, it is possible to obtain the emission light beam having a nearly constant quantity of illumination light irrespective of the positions of the emission surface 54f to whereby make possible to perform a uniform illumination. As shown in traced drawings for the light beams, though the light beam reflected on each of the total reflection surfaces gradually inclines, a quantity of light itself emitted through the emission surface 54f is held nearly constant.

Note that while in this embodiment, the light direction conversion surface 54g is divided into the four areas, and the angles of the total reflection surfaces are made different from one another in the individual areas, the present invention is not intended to be limited thereto. That is, the light direction conversion surface 54g may be divided into many areas more than the four areas, and the angles of the total reflection surfaces may be made different from one another for the individual areas. In addition, the angle of the total reflection surface may be continuously changed in a longitudinal direction of the light direction conversion surface 54g.

Sixth Embodiment

Next, a sixth embodiment of the present invention will be described with reference to FIGS. 36A to 36D, and FIGS. 37A to 37D. FIGS. 36A to 36D are vertical cross sectional views each showing a main portion of a stroboscopic apparatus as an illumination apparatus according to the sixth embodiment of the present invention, and FIGS. 37A to 37D are views each schematically showing a state in which an irradiation direction conversion member 55 shown in FIGS. 36A to 36D is moved in a longitudinal direction of an optical member 54.

As shown in FIGS. 36A to 36D, this embodiment is different from the fifth embodiment in that the irradiation direction conversion member 55, which is horizontally movable, is disposed so as to face an emission surface 54f of the optical member 54. Note that the same members as those in the fifth embodiment are designated with the same reference symbols, and their descriptions are omitted here.

In the above-mentioned fifth embodiment, by changing the angles of the total reflection surfaces of the light direction conversion surface 54g, a quantity of emitted light in each position of the emission surface 54f of the optical member 54 becomes nearly constant. However, that construction shows a tendency in which the emission direction of the light beams in the corresponding position of the emission surface 54f is gradually inclined as apart from the light source. Then, in this embodiment, in order to correct the tendency in which the emission direction of the light beams is inclined, the irradiation direction conversion member 55 for adjusting only the irradiation direction of the light beams emitted through the optical member 54 is provided.

The irradiation direction conversion member 55 is a plate-like optical member on which a Fresnel lens 55a is formed on the emission surface side. A shape of the Fresnel lens 55a is regulated by the emission direction of the light beams determined by the angle of the total reflection surface of the light direction conversion surface 54g of the optical member 54. The Fresnel lens 55a is configured so as its angle to continuously change along a longitudinal direction of the illumination direction conversion member 55. Here, since the emission direction of the light beams from the optical member 54 is substantially perpendicular to the emission surface 54f in the position near the light source, the angle of the Fresnel lens 55a is set to a gentle angle. In the positions distant from the light source, the emission direction of the light beams from the optical member 54 is gradually inclined toward the emission surface 54f. Hence, in order to correct the emission direction, the angle of the Fresnel lens 55a is set to a steep angle.

As shown in FIGS. 36A to 36D, the above-mentioned irradiation direction conversion member 55 is provided, whereby the emission light beams are converted into the light beams having a light distribution with the substantially perpendicular direction as its center. In addition, it is understood that the light distribution characteristics are identical to one another irrespective of the positions. Consequently, it is possible to obtain the illumination light having the uniform light distribution characteristics and intensity irrespective of the positions by the provision of the irradiation direction conversion member 55.

In addition, in this embodiment, the irradiation direction conversion member 55 is configured movable in a longitudinal direction of the optical member 54. Normally, the emission optical axis is preferably set perpendicular to the emission surface in many cases. However, in some case, the emission optical axis is required to be slightly inclined from a direction perpendicular to the emission surface. For example, if photographing at close range (e.g., 50 cm) on which a normal photographing lens can focus (not the proximity photographing such as macro photographing), in some cases, a proper illumination can be obtained rather by an illumination whose direction is inclined with respect to the optical axis of the photographing lens to some degree than by an illumination whose direction is aligned with the optical axis direction of the photographing lens (parallax correction).

Then, in this embodiment, as shown in FIGS. 37A to 37D, the irradiation direction conversion member 55 is moved in a longitudinal direction of the optical member 54, whereby the direction of the emission optical axis of the illumination light can be finely changed.

Note that while in this embodiment, there has been shown the case where the angle of the Fresnel lens 55a of the irradiation direction conversion member 55 is continuously changed, the angle of the Fresnel lens 55a is desirably changed corresponding to the angle of the total reflection surface of the light direction conversion surface 54g formed in the optical member 54.

In addition, while the Fresnel lens 55a of the irradiation direction conversion member 55 is formed on the surface facing outside, the present invention is not intended to be limited to this surface. That is, the Fresnel lens 55a of the irradiation direction conversion member 55 may also be formed on a surface of the irradiation direction conversion member 55 facing the emission surface 54f of the optical member 54.

Moreover, while there has been shown the member having the Fresnel lens used as the irradiation direction conversion member, a normal cylindrical lens may be used instead of Fresnel lens, and a plurality of inclined surfaces having different angles from one another may be used as the case may be.

The effects peculiar to the above-mentioned first to sixth embodiments will hereinafter be described.

According to the present invention, it is possible to provide an illumination in which the light beams having the uniform and fixed angle distribution can be applied as illumination light, and hence the illumination having the uniform light distribution can be obtained based on the operation of the light direction conversion surface in which functions of reflection and refraction are combined with each other.

This application claims priority from Japanese Patent Application No. 2004-068795 filed Mar. 11, 2004, which is hereby incorporated by reference herein.

What is claimed is:

1. An illumination apparatus installable in a photographing apparatus including a photographing lens barrel and a light source located in a circumference of the photographing lens barrel, the illumination apparatus comprising:

a first optical member to which light emitted by the light source is made incident and which serves to guide the incident light in a predetermined direction; and a second optical member having an emission surface, from which light is emitted toward an optical axis direction of the photographing lens barrel, and connected to the first optical member, wherein the second optical member further has a light direction conversion surface disposed to face the emission surface for, while regulating a traveling direction of light made incident on the incidence surface within the second optical member, guiding the light to the emission surface, and a plurality of prism-like portions each having a total reflection surface and a reincidence surface are continuously formed in the light direction conversion surface; and wherein of light which travels within the second optical member to reach the total reflection surface of one of the prism-like portions, only light of a predetermined angle component is totally reflected on the total reflection surface toward the emission surface, and light which is not totally reflected on the total reflection surface other than the light of the predetermined angle component is refracted in the one prism-like portion to be guided to an outside of the second optical member once and is then guided to the second optical member again through the reincidence surface of a prism-like portion next to the one prism-like portion, wherein the second optical member comprises first, second, and third areas, the first area bordering the first optical member, and the second area being between the first and third areas, wherein the first area is configured so that an envelope connecting vertices of the prism-like portions is inclined from a boundary between the first area and the first optical member to the second area in such a direction that the thickness thereof increases in the direction from the connection portion to the second area, wherein the second area has a fixed thickness, and wherein the third area is configured so that an envelope connecting vertices of the prism-like portions is inclined from the second area in such a direction that the thickness thereof decreases from the boundary between the second and third areas.

2. An illumination apparatus according to claim 1, wherein the second optical member comprises a substantially ring-like member as to surround an outer periphery of the photographing lens barrel.

3. An illumination apparatus according to claim 2 wherein the emission surface of the second optical member comprises a surface extending in a strip form along the outer periphery of the photographing lens barrel.

4. An illumination apparatus according to claim 1, wherein the first optical member has a total reflection surface for totally reflecting incident light toward the second optical member.

5. An illumination apparatus according to claim 1, wherein the first optical member has a condensing function of, while guiding incident light to the second optical member, narrowing an irradiation range.

6. An illumination apparatus according to claim 1, wherein the first optical member is connected to the second optical member so that light incident from the light source is incident in a single tangential direction of the photographing lens barrel portion.

7. An illumination apparatus according to claim 1, wherein the first optical member and the second optical member are formed integrally with each other.

8. An illumination apparatus according to claim 2, wherein a radius of the second optical member, r, is set to satisfy a following inequality:

$$10(mm) \leq r \leq 100(mm).$$

9. An illumination apparatus according to claim 2, wherein a radial width of the second optical member, w, is set to satisfy a following inequality:

$$1(mm) \leq w \leq 10(mm).$$

10. An illumination apparatus according to claim 1, wherein the light source is a light source for emitting stationary light.

11. An illumination apparatus according to claim 1, wherein the light source is a light source for emitting flash light.

12. A photographing apparatus, comprising:

an illumination apparatus according to claim 1; and a photographing system for photographing a subject illuminated by the illumination apparatus.

13. An illumination apparatus installable in a photographing apparatus including a photographing lens barrel and a light source located in a circumference of the photographing lens barrel, the illumination apparatus comprising:

a first optical member to which light emitted by the light source is made incident and which serves to guide the incident light in a predetermined direction; and a second optical member having an emission surface, from which light is emitted toward an optical axis direction of the photographing lens barrel, and connected to the first optical member, wherein the second optical member further has a light direction conversion surface disposed to face the emission surface for, while regulating a traveling direction of light made incident on the incidence surface within the second optical member, guiding the light to the emission surface, and a plurality of prism-like portions each having a total reflection surface and a reincidence surface are continuously formed in the light direction conversion surface; and wherein of light which travels within the second optical member to reach the total reflection surface of one of the prism-like portions, only light of a predetermined angle component is totally reflected on the total reflection surface toward the emission surface, and light which is not totally reflected on the total reflection surface other than the light of the predetermined angle component is refracted in the one prism-like portion to be guided to an outside of the second optical member once and is then guided to the second optical member again through the reincidence surface of a prism-like portion next to the one prism-like portions wherein the second optical member comprises a substantially ring-like member as to surround an outer periphery of the photographing lens barrel;

wherein the emission surface of the second optical member comprises a surface extending in a strip form along the outer periphery of the photographing lens barrel;

wherein the first optical member has a total reflection surface for totally reflecting incident light toward the second optical member;

wherein the first optical member has a condensing function of, while guiding incident light to the second optical member, narrowing an irradiation range;

wherein the first optical member is connected to the second optical member so that light incident from the light source is incident in a single tangential direction of the photographing lens barrel portion; and wherein the first optical member and the second optical member are formed integrally with each other.

* * * * *